(12) United States Patent
Takeo

(10) Patent No.: US 6,272,233 B1
(45) Date of Patent: Aug. 7, 2001

(54) METHOD AND APPARATUS FOR DETECTING PROSPECTIVE ABNORMAL PATTERNS

(75) Inventor: Hideya Takeo, Kanagawa-ken (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/140,774

(22) Filed: Aug. 26, 1998

(30) Foreign Application Priority Data

Aug. 27, 1997 (JP) ............................................ 9-230529

(51) Int. Cl.⁷ .................................................. G06K 9/00
(52) U.S. Cl. ................................................. 382/128; 128/922
(58) Field of Search .................................... 382/128, 132, 382/129, 257, 130, 131; 250/587; 378/37

(56) References Cited

U.S. PATENT DOCUMENTS

| | | | |
|---|---|---|---|
| 4,907,156 | * 3/1990 | Doi et al. ....................... | 364/413.13 |
| 5,133,020 | * 7/1992 | Giger et al. ..................... | 382/6 |
| 5,172,419 | * 12/1992 | Manian ........................... | 382/132 |
| 5,457,754 | * 10/1995 | Han et al. ....................... | 382/128 |
| 5,481,623 | * 1/1996 | Hara .............................. | 382/128 |
| 5,535,289 | * 7/1996 | Ito ................................ | 382/130 |
| 5,572,565 | * 11/1996 | Abdel Mottaleb ................. | 378/37 |
| 5,583,346 | * 12/1996 | Nakajima ........................ | 250/587 |
| 5,761,334 | * 6/1998 | Kakajima et al. ................. | 382/132 |
| 5,784,482 | * 7/1998 | Nakajima ........................ | 382/132 |
| 6,014,474 | * 1/2000 | Takeo et al. ..................... | 382/308 |

OTHER PUBLICATIONS

Collected Papers of the Institute of Electronics and Communication Engineers of Japan, D–11, vol. J75–D–11, No. 3, Mar. 1992, pp. 663–670, "Detection of Tumor Patterns in DR Images (Iris Filter)", Kobatake et al.

International Journal of Computer Vision, vol. 1, No. 4, 1988, pp. 321–331, "Snakes: Active Contour Models", M. Kass et al.

* cited by examiner

Primary Examiner—Joseph Mancusco
Assistant Examiner—Abolfazl Tabatabai
(74) Attorney, Agent, or Firm—Sughrue, Mion, Zinn, Macpeak & Seas, PLLC

(57) ABSTRACT

A prospective abnormal pattern is detected in accordance with one of image signals representing radiation images of the right and left mammae of an object. A region of the detected prospective abnormal pattern in one radiation image, which is represented by the one image signal, and a region in the other mamma radiation image, which region corresponds to the position of the region of the detected prospective abnormal pattern in the one radiation image, are set. Iris filter processing is carried out on image signal components, which represent picture elements located in the region of the detected prospective abnormal pattern in the one radiation image, and on image signal components, which represent picture elements located in the region in the other mamma radiation image. Iris filter output signals are thereby obtained. A calculation is made to find a difference value between the iris filter output signals, which have been obtained with respect to corresponding picture elements in the regions. A definite prospective abnormal pattern is detected in accordance with the difference value.

16 Claims, 15 Drawing Sheets

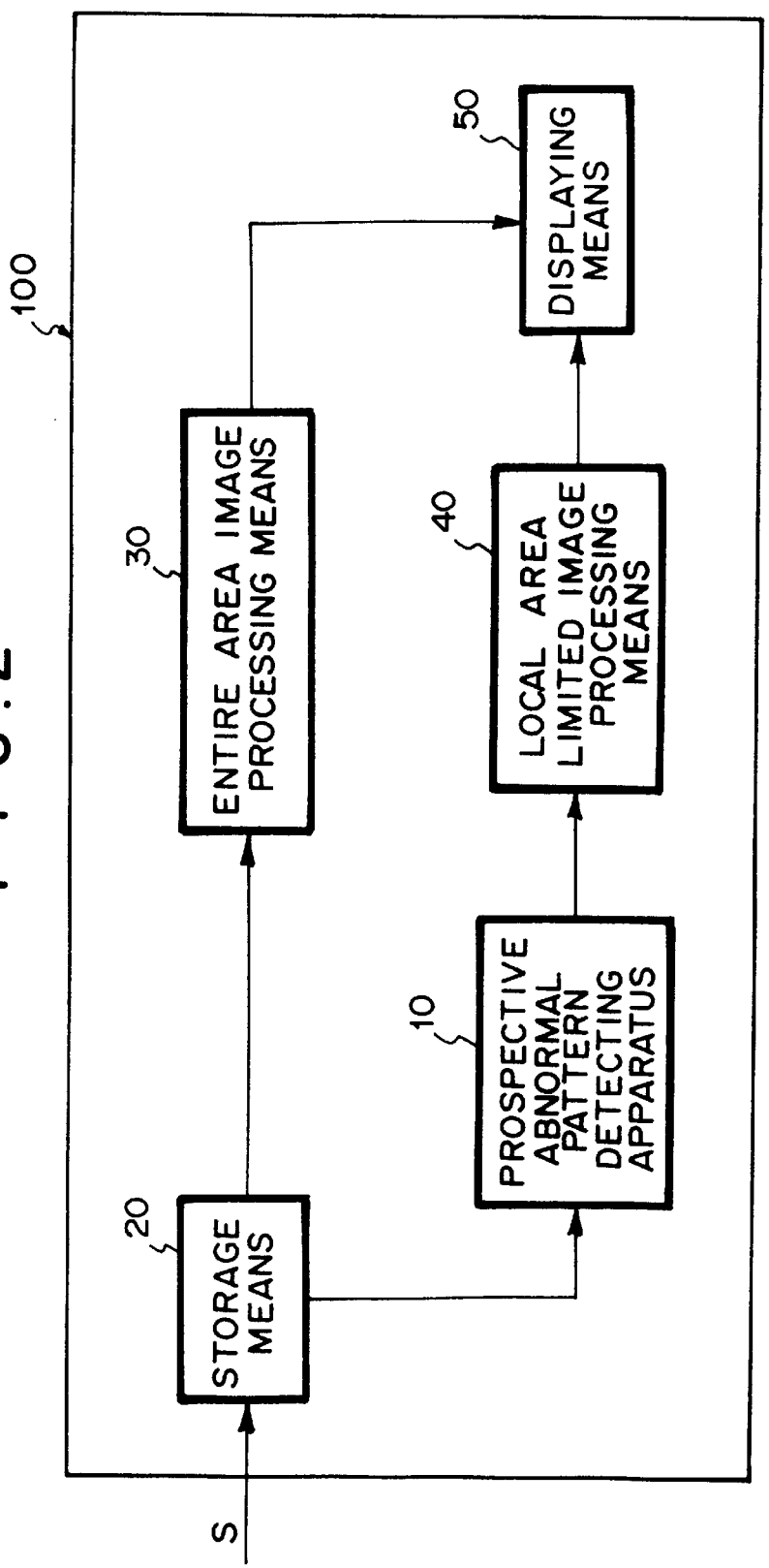

(CC(R) IMAGE)

(CC(L) IMAGE)

FIG. 9

| $f_7$ | $f_6$ | $f_5$ | $f_4$ | $f_3$ |
|---|---|---|---|---|
| $f_8$ |   |   |   | $f_2$ |
| $f_9$ |   |   |   | $f_1$ |
| $f_{10}$ |   |   |   | $f_{16}$ |
| $f_{11}$ | $f_{12}$ | $f_{13}$ | $f_{14}$ | $f_{15}$ |

PICTURE ELEMENT j

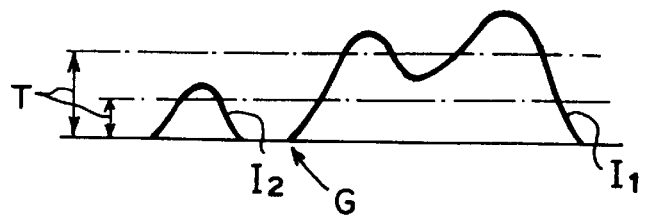
F I G. 11A
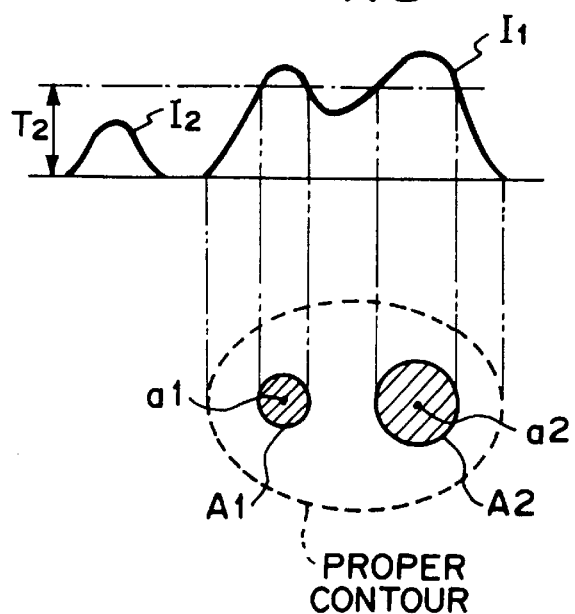
F I G. 11B
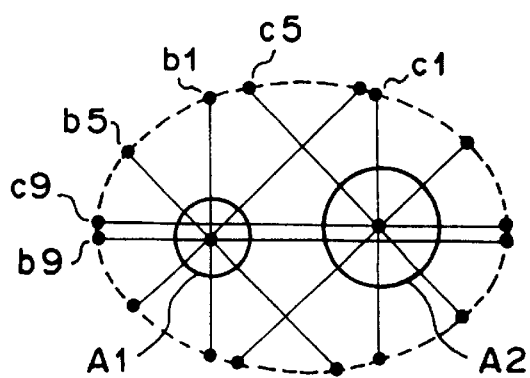
F I G. 11C

FIG.17

| i\j | 0 | 1 | 2 | 3 | 4 | 5 | 6 | 7 | 8 | 9 | 10 |
|---|---|---|---|---|---|---|---|---|---|---|---|
| 0 | 1 | | | | | | | | | | |
| 1 | | 1 | | | | | | | | | |
| 2 | | | | | | | | | | | |
| 3 | | | | | | | | | | | |
| 4 | | | | | | | | | | | |
| 5 | | | | 2 | | | | | | | |
| 6 | | | | | | | | | | | |
| 7 | | | | | | | | | | | |
| 8 | | | | | | | | | | | |
| 9 | | | | | | | | | | | |
| 10 | | | | | | | | | | | |

METHOD AND APPARATUS FOR DETECTING PROSPECTIVE ABNORMAL PATTERNS

BACKGROUND OF THE INVENTION

1. Field of the Invention

This invention relates to a method and apparatus for detecting a prospective abnormal pattern. This invention particularly relates to a method and apparatus for detecting a prospective abnormal pattern in accordance with radiation images of the right and left mammae.

2. Description of the Prior Art

Image processing, such as gradation processing or frequency processing, has heretofore been carried out on an image signal, which represents an image and has been obtained with one of various image acquiring methods, such that a visible image having good image quality can be reproduced and used as an effective tool in, particularly, the accurate and efficient diagnosis of an illness. Particularly, in the field of medical images, such as radiation images of human bodies serving as objects, it is necessary for specialists, such as doctors, to make an accurate diagnosis of an illness or an injury of the patient in accordance with the obtained image. Therefore, it is essential to carry out the image processing in order that a visible image having good image quality can be reproduced and used as an effective tool in the accurate and efficient diagnosis of an illness.

In such image processing, the processing is often carried out on the entire area of the image. Alternatively, in cases where the purpose of examination or diagnosis is clear to a certain extent, the emphasis processing is often carried out selectively on a desired image portion, which is adapted to the purpose of examination or diagnosis.

Ordinarily, when an image portion to be processed is to be selected, the person, who views the radiation image, views the original image before being processed and manually selects the image portion to be processed. However, there is the risk that the selected image portion or the specified image range will vary, depending upon the level of the experience or the image understanding capability of the person, who views the radiation image, and the selection cannot be carried out objectively.

For example, in cases where a radiation image has been recorded for the examination of breast cancer, it is necessary to find a tumor pattern, which is one of features of a cancerous portion, from the radiation image. However, the range of the tumor pattern cannot always be specified accurately. Therefore, there is a strong demand for techniques for accurately detecting an abnormal pattern, such as a tumor pattern, without depending upon the skill of the person, who views the radiation image.

In order to satisfy the demand described above, extensive research has been carried out to make a computer aided diagnosis of medical images (CADM).

Specifically, with the CADM techniques, prospective abnormal patterns, which are considered as being abnormal patterns, such as tumor patterns or small calcified patterns, are detected automatically by carrying out detection processing with computers in accordance with features of image density distribution or forms of the abnormal patterns. As the processing for the detection of prospective abnormal patterns, iris filter processing, which is suitable for the detection of, primarily, prospective tumor patterns, has heretofore been proposed. [Reference should be made to "Detection of Tumor Patterns in DR Images (Iris Filter)," Kobatake, et al., Collected Papers of The Institute of Electronics and Communication Engineers of Japan, D-II, Vol. J75-D-II, No. 3, pp. 663–670, March 1992.] The iris filter processing has been studied as a technique efficient for detecting, particularly, a tumor pattern, which is one of characteristic forms of mammary cancers. However, the image to be processed with the iris filter is not limited to the tumor pattern in a mammogram, and the iris filter processing is applicable to any kind of image portion having the characteristics such that the gradients of the image signal (the image density, or the like) representing the image are centralized.

How the processing for detecting a prospective abnormal pattern with the iris filter is carried out will be described hereinbelow by taking the processing for the detection of the tumor pattern as an example.

It has been known that, for example, in a radiation image recorded on X-ray film (i.e., an image yielding an image signal of a high signal level for a high image density), the image density values of a tumor pattern are slightly smaller than the image density values of the surrounding image areas. The image density values of the tumor pattern are distributed such that the image density value becomes smaller from the periphery of an approximately circular tumor pattern toward the center point of the tumor pattern. Thus the distribution of the image density values of the tumor pattern has gradients of the image density values. Therefore, in the tumor pattern, the gradients of the image density values can be found in local areas, and the gradient lines (i.e., gradient vectors) centralize in the directions heading toward the center point of the tumor pattern.

The iris filter calculates the gradients of image signal values, which are represented by the image density values, as gradient vectors and feeds out the information representing the degree of centralization of the gradient vectors. With the iris filter processing. a tumor pattern is detected in accordance with the degree of centralization of the gradient vectors.

Specifically, by way of example, as illustrated in FIG. 18A, a tumor pattern $P_1$ may be embedded in a mammogram P. As illustrated in FIG. 18B, the gradient vector at an arbitrary picture element in the tumor pattern $P_1$ is directed to the vicinity of the center point of the tumor pattern $P_1$. On the other hand, as illustrated in FIG. 18C, in an elongated pattern $P_2$, such as a blood vessel pattern or a mammary gland pattern, gradient vectors do not centralize upon a specific point. Therefore, the distributions of the directions of the gradient vectors in local areas may be evaluated, and a region, in which the gradient vectors centralize upon a specific point, may be detected. The thus detected region may be taken as a prospective tumor pattern, which is considered as being a tumor pattern. As illustrated in FIG. 18D, in a pattern $P_3$, in which elongated patterns, such as mammary gland patterns, intersect each other, gradient vectors are liable to centralize upon a specific point. Therefore, the pattern $P_3$ may be detected as a false positive (FP).

The processing with the iris filter is based on the fundamental concept described above. Steps of algorithms of the iris filter will be described hereinbelow.

(Step 1) Calculation of Gradient Vectors

For each picture element j among all of the picture elements constituting a given image, the direction θ of the gradient vector of the image signal representing the image is calculated with Formula (1) shown below.

$$\theta = \tan^{-1} \frac{(f_3 + f_4 + f_5 + f_6 + f_7) - (f_{11} + f_{12} + f_{13} + f_{14} + f_{15})}{(f_1 + f_2 + f_3 + f_{15} + f_{16}) - (f_7 + f_8 + f_9 + f_{10} + f_{11})} \quad (1)$$

As illustrated in FIG. 9, $f_1$ through $f_{16}$ in Formula (1) represent the picture element values (i.e., the image signal values) corresponding to the picture elements located at the peripheral areas of a mask, which has a size of, for example, five picture elements (located along the column direction of the picture element array)×five picture elements (located along the row direction of the picture element array) and which has its center at the picture element j.

(Step 2) Calculation of the Degree of Centralization of Gradient Vectors

Thereafter, for each picture element among all of the picture elements constituting the given image, the picture element is taken as a picture element of interest, and the degree of centralization C of the gradient vectors with respect to the picture element of interest is calculated with Formula (2) shown below.

$$C = (1/N)\sum_{j=1}^{N} \cos\theta_j \quad (2)$$

As illustrated in FIG. 10, in Formula (2), N represents the number of the picture elements located in the region inside of a circle, which has its center at the picture element of interest and has a radius R, and θj represents the angle made between the straight line, which connects the picture element of interest and each picture element j located in the circle, and the gradient vector at the picture element j, which gradient vector has been calculated with Formula (1). Therefore, in cases where the directions of the gradient vectors of the respective picture elements j centralize upon the picture element of interest, the degree of centralization C represented by Formula (2) takes a large value.

The gradient vector of each picture element j, which is located in the vicinity of a tumor pattern, is directed approximately to the center portion of the tumor pattern regardless of the level of the contrast of the tumor pattern. Therefore, it can be regarded that the picture element of interest associated with the degree of centralization C, which takes a large value, is the picture element located at the center portion of the tumor pattern. On the other hand, in a linear pattern, such as a blood vessel pattern, the directions of the gradient vectors are biased to a certain direction, and therefore the value of the degree of centralization C is small. Accordingly, a tumor pattern can be detected by taking each of all picture elements, which constitute the image, as the picture element of interest, calculating the value of the degree of centralization C with respect to the picture element of interest, and rating whether the value of the degree of centralization C is or is not larger than a predetermined threshold value. Specifically, the processing with the iris filter has the features over an ordinary difference filter in that the processing with the iris filter is not apt to be adversely affected by blood vessel patterns, mammary gland patterns, or the like, and can efficiently detect tumor patterns.

In actual processing, such that the detection performance unaffected by the sizes and shapes of tumor patterns may be achieved, it is contrived to adaptively change the size and the shape of the filter. FIG. 8 shows an example of the filter. The filter is different from the filter shown in FIG. 9. With the filter of FIG. 8, the degree of centralization is rated only with the picture elements, which are located along radial direction lines extending radially from a picture element of interest in M kinds of directions adjacent at 2π/M degree intervals. (In FIG. 8, by way of example, 32 directions at 11.25 degree intervals are shown.)

In cases where the picture element of interest has the coordinates (k, l), the coordinates ([x], [y]) of the picture element, which is located along an i'th radial direction line and is the n'th picture element as counted from the picture element of interest, are given by Formulas (3) and (4) shown below.

$$x = k + n \cos\{2\pi(i-1)/M\} \quad (3)$$

$$y = l + n \sin\{2\pi(i-1)/M\} \quad (4)$$

wherein [x] represents the maximum integer, which does not exceed x, and [y] represents the maximum integer, which does not exceed y.

Also, for each of the radial direction lines, the output value obtained for the picture elements ranging from a certain picture element to a picture element, which is located along the radial direction line and at which the maximum degree of centralization is obtained, is taken as the degree of centralization Cimax with respect to the direction of the radial direction line. The mean value of the degrees of centralization Cimax, which have been obtained for all of the radial direction lines, is then calculated. The mean value of the degrees of centralization Cimax having thus been calculated is taken as the degree of centralization C of the gradient vector group with respect to the picture element of interest.

Specifically, the degree of centralization Ci(n), which is obtained for the picture elements ranging from the picture element of interest to the n'th picture element located along the i'th radial direction line, is calculated with Formula (5) shown below.

$$Ci(n) = \sum_{l=1}^{n} \{(\cos\theta_{il})/n\}, \; Rmin \leq n \leq Rmax \quad (5)$$

wherein Rmin and Rmax respectively represent the minimum value and the maximum value having been set for the radius of the tumor pattern, which is to be detected.

Specifically, with Formula (5), the degree of centralization Ci(n) is calculated with respect to all of the picture elements, which are located along each of the radial direction lines and fall within the range from a starting point to an end point, the starting point being set at the picture element of interest, the end point being set at one of picture elements that are located between a position at the length of distance corresponding to the minimum value Rmin having been set for the radius of the tumor pattern, which is to be detected, and a position at the length of distance corresponding to the maximum value Rmax.

Thereafter, the degree of centralization C of the gradient vector group is calculated with Formulas (6) and (7) shown below.

$$Ci_{\max} = \max_{Rmin \leq n \leq Rmax} Ci(n) \quad (6)$$

$$C = (1/32)\sum_{i=1}^{32} Ci_{\max} \quad (7)$$

The value of Cimax of Formula (6) represents the maximum value of the degree of centralization Ci(n) obtained for each of the radial direction lines with Formula (5).

Therefore, the region from the picture element of interest to the picture element associated with the degree of centralization Ci(n), which takes the maximum value, may be considered as being the region of the prospective tumor pattern along the direction of the radial direction line.

The calculation with Formula (6) is made for all of the radial direction lines, and the contours (marginal points) of the regions of the prospective tumor pattern on all of the radial direction lines are thereby detected. The adjacent marginal points of the regions of the prospective tumor pattern on the radial direction lines are then connected by a straight line or a non-linear curve. In this manner, it is possible to specify the contour of the region, which may be regarded as the prospective tumor pattern.

Thereafter, with Formula (7), the mean value of the maximum values Cimax of the degrees of centralization within the aforesaid regions, which maximum values Cimax have been given by Formula (6) for all directions of the radial direction lines, is calculated. In Formula (7), by way of example, the radial direction lines are set along 32 directions. The calculated mean value serves as an output value I of the iris filter processing. The output value I is compared with a predetermined constant threshold value T, which is appropriate for making a judgment as to whether the detected pattern is or is not a prospective tumor pattern. In cases where $I \geq T$, it is judged that the region having its center at the picture element of interest is a prospective abnormal pattern (a prospective tumor pattern). In cases where $I < T$, it is judged that the region having its center at the picture element of interest is not a prospective tumor pattern.

In the manner described above, the region of the prospective tumor pattern can be detected.

The size and the shape of the region, in which the degree of centralization C of the gradient vector group with Formula (7) is rated, change adaptively in accordance with the distribution of the gradient vectors. Such an adaptive change is similar to the manner, in which the iris of the human's eye expands or contracts in accordance with the brightness of the external field. Therefore, the aforesaid technique for detecting the region of the prospective tumor pattern by utilizing the degrees of centralization of the gradient vectors is referred to as the iris filter processing.

The calculation of the degree of centralization Ci(n) may be carried out by using Formula (5') shown below in lieu of Formula (5).

$$Ci(n) = \frac{1}{n - Rmin + 1} \sum_{l=Rmin}^{n} \cos\theta_{il}, \; Rmin \leq n \leq Rmax \quad (5')$$

Specifically, with Formula (5'), the degree of centralization Ci(n) is calculated with respect to all of the picture elements, which are located along each of the radial direction lines and fall within the range from a starting point to an end point, the starting point being set at a picture element that is located at the length of distance corresponding to the minimum value Rmin having been set for the radius of the tumor pattern to be detected, which length of distance is taken from the picture element of interest, the end point being set at one of picture elements that are located between the position at the length of distance corresponding to the minimum value Rmin and the position at the length of distance corresponding to the maximum value Rmax, which length of distance is taken from the picture element of interest.

By carrying out the steps described above, the iris filter can efficiently detect only the tumor pattern, which has a desired size, from a radiation image. Research has heretofore been carried out on the iris filter particularly for the purpose of detecting a cancerous portion from a mammogram.

With the aforesaid processing for the detection of the prospective abnormal pattern, in which the iris filter is utilized, it often occurs that a false positive, which is not an abnormal pattern and has feature measures similar to those of the abnormal pattern, is detected by mistake as a prospective abnormal pattern.

SUMMARY OF THE INVENTION

The primary object of the present invention is to provide a method of detecting a prospective abnormal pattern, wherein the accuracy, with which a prospective abnormal pattern embedded in a mamma image is detected, is enhanced.

Another object of the present invention is to provide an apparatus for carrying out the method of detecting a prospective abnormal pattern.

The methods and apparatuses for detecting a prospective abnormal pattern in accordance with the present invention are based upon the findings that mamma radiation images of an object include the images of the right and left mammae of the object, and there is little probability of tumors occurring simultaneously at corresponding positions in the right and left mammae.

Specifically, the present invention provides a first method of detecting a prospective abnormal pattern, in which an image signal representing a radiation image of the right mamma of an object and an image signal representing a radiation image of the left mamma of the object are obtained, each of the image signals being made up of a series of image signal components representing picture elements in the radiation image, and a prospective abnormal pattern is detected from one of the radiation images of the right and left mammae in accordance with the image signals, the method comprising the steps of:

(a) detecting the prospective abnormal pattern in accordance with one of the image signals representing the radiation images of the right and left mammae, (b) setting a region of the detected prospective abnormal pattern in one radiation image, which is represented by the one image signal, and a region in the other mamma radiation image, which region corresponds to the position of the region of the detected prospective abnormal pattern in the one radiation image, (c) carrying out iris filter processing on image signal components, which represent picture elements located in the region of the detected prospective abnormal pattern in the one radiation image, and on image signal components, which represent picture elements located in the region in the other mamma radiation image, iris filter output signals being thereby obtained, (d) calculating a difference value between the iris filter output signals, which have been obtained with respect to corresponding picture elements in the regions, and (e) detecting a definite prospective abnormal pattern in accordance with the difference value.

By way of example, the detection of the definite prospective abnormal pattern in accordance with the difference value may be carried out by comparing the difference value and a predetermined threshold value with each other. In cases where the difference value is larger than the predetermined threshold value, the prospective abnormal pattern may be detected as the definite prospective abnormal pattern. In cases where the difference value is smaller than the predetermined threshold value, the prospective abnormal pattern may be regarded as not being a definite prospective abnormal pattern.

The present invention also provides a second method of detecting a prospective abnormal pattern, in which an image signal representing a radiation image of the right mamma of an object and an image signal representing a radiation image of the left mamma of the object are obtained, each of the image signals being made up of a series of image signal components representing picture elements in the radiation image, and a prospective abnormal pattern is detected from one of the radiation images of the right and left mammae in accordance with the image signals, the method comprising the steps of:

(a) detecting the prospective abnormal pattern in accordance with one of the image signals representing the radiation images of the right and left mammae, (b) setting a region of the detected prospective abnormal pattern in one radiation image, which is represented by the one image signal, and a region in the other mamma radiation image, which region corresponds to the position of the region of the detected prospective abnormal pattern in the one radiation image, (c) carrying out iris filter processing on image signal components, which represent picture elements located in the region of the detected prospective abnormal pattern in the one radiation image, and on image signal components, which represent picture elements located in the region in the other mamma radiation image, iris filter output signals being thereby obtained, (d) calculating a difference value between the iris filter output signals, which have been obtained with respect to corresponding picture elements in the regions, (e) calculating a rating function value, which represents a degree of malignancy of the detected prospective abnormal pattern, in accordance with the image signal components, which represent the picture elements located in the region of the detected prospective abnormal pattern in the one radiation image, and (f) detecting a definite prospective abnormal pattern in accordance with the rating function value and the difference value.

As the rating function value, which represents the degree of malignancy of the detected prospective abnormal pattern, for example, a Mahalanobis distance may be employed.

Specifically, in general, the region of a detected prospective abnormal pattern is expressed in terms of an n-dimensional space with the form of x=(x1, x2, x3, . . . , xn) by using n-order feature measures x1, x2, x3, . . . , xn. The n-dimensional axes are referred to as the feature axes. More specifically, the values (index values), which are obtained from the feature extraction, are the values xi (where i=1, 2, . . . , n) on the respective feature axes.

One of important properties, which the n-dimensional pattern space formed by the feature extraction step should have, is that the similarity of the patterns, which are given as the inputs, with respect to each other should be kept appropriately in the pattern space. Specifically, if the pattern space does not have the properties such that similar patterns may take positions close to each other in the pattern space, there is no sense in carrying out the feature extraction. Therefore, the concept of distance is introduced into the pattern space.

Various functions (distance functions) for expressing the concept of distance have been proposed. Typical examples of the function values include the Euclidean distance, the Mahalanobis distance, the city block distance, the chess board distance, and the Minkowski distance. The most simplest function value is the Euclidean distance. However, the Euclidean distance does not take the state of the spread of the pattern into consideration, and therefore it is considered that the Euclidean distance is not suitable for the method of detecting an abnormal pattern in accordance with the present invention.

Therefore, it is preferable that the most basic Mahalanobis distance is employed, and the state of spread of the pattern is taken into consideration.

The term "Mahalanobis distance" means the distance, Dmi, which is defined by Formula (8) shown below. The Mahalanobis distance is measured from the center point of the distribution and with the weighting of a hyper-ellipsoid expressed by a covariance matrix $\Sigma$.

$$Dmi = \left(\vec{x} - \vec{mi}\right)^t \Sigma_i^{-1} \left(\vec{x} - \vec{mi}\right) \tag{8}$$

wherein $\Sigma i$ represents the covariance matrix of the pattern class (pattern classification between the normal pattern of i=1 and the abnormal pattern of i=2) wi, i.e., $$\Sigma_i = (1/Ni) \sum_{x \in wi} \left(\vec{x} - \vec{mi}\right)\left(\vec{x} - \vec{mi}\right)^t$$

t represents the transposed vector (row vector), $\vec{x}$ represents the vector of the feature measure x, i.e., $$\vec{x} = (x1, x2, \cdots, xN)$$

$\Sigma i^{-1}$ represents the inverse matrix of $\Sigma i$, and $\vec{mi}$ represents the mean value of the pattern classes wi, i.e., $$\vec{mi} = (1/Ni) \sum_{x \in wi} \vec{x}$$

Specifically, the steps described below are carried out:
1) The respective index values are calculated with respect to the region of the prospective abnormal pattern which is to be detected.
2) The feature measure vector $$\vec{x} = (x1, x2, \cdots, xn)$$

is defined in accordance with each index value.
3) The Mahalanobis distance Dm1 with respect to the pattern class (i=1), which represents the normal pattern (FP) and has been obtained experimentally, and the Mahalanobis distance Dm2 with respect to the pattern class (i=2), which represents the abnormal pattern and has been obtained experimentally, are calculated with Formula (8).
4) The Mahalanobis distances Dm1 and Dm2 are compared with each other. In cases where the Mahalanobis distance Dm1 with respect to the pattern class, which represents the normal pattern, is shorter than the Mahalanobis distance Dm2 with respect to the pattern class, which represents the abnormal pattern, i.e. in cases where Dm1<Dm2, it is judged that the pattern is the normal pattern. In cases where the Mahalanobis distance Dm2 with respect to the pattern class, which represents the abnormal pattern, is shorter than the Mahalanobis distance Dm1 with respect to the pattern class, which represents the normal pattern, i.e. in cases where Dm1>Dm2, it is judged that the pattern is the abnormal pattern.

In the second method of detecting a prospective abnormal pattern in accordance with the present invention, specifically, the ratio (Dm1/Dm2) of the Mahalanobis distance Dm1 to the Mahalanobis distance Dm2 is calculated as the ultimate rating function value.

As described above, in cases where the Mahalanobis distance is employed as the rating function value, instead of the rating function value and the threshold value being compared with each other, the rating function values are compared with each other. On the basis of the results of the comparison, a judgment can be made as to whether the level of probability of the prospective abnormal pattern being the true abnormal pattern is or is not high.

Also, the definite prospective abnormal pattern is detected in accordance with the rating function value and the difference value. For such purposes, specifically, the difference value may be weighted with the rating function value, and the weighted difference value and a predetermined threshold value may be compared with each other. In cases where the weighted difference value is larger than the predetermined threshold value, the prospective abnormal pattern may be detected as the definite prospective abnormal pattern. In cases where the weighted difference value is smaller than the predetermined threshold value, the prospective abnormal pattern may be regarded as not being a definite prospective abnormal pattern.

In the first and second methods of detecting a prospective abnormal pattern in accordance with the present invention, the detection of the prospective abnormal pattern may be carried out with a first process comprising the steps of:

(1) for each picture element among all of the picture elements in the one radiation image of the mamma, which is represented by the one image signal, calculating a gradient vector of the image signal, (2) setting an arbitrary picture element, which is among all of the picture elements in the radiation image, as a picture element of interest, (3) setting a plurality of radial direction lines on the radiation image, the radial direction lines extending radially from the picture element of interest and being adjacent to one another at predetermined angle intervals, (4) calculating an index value $\cos \theta il$ for each picture element among the picture elements, which are located along each of the radial direction lines and fall within the range from the picture element of interest to a picture element that is located at a length of distance corresponding to the maximum size of the prospective abnormal pattern to be detected, the index value $\cos \theta il$ being calculated from an angle $\theta il$ that is made between the gradient vector, which has been calculated for each picture element, and the direction along which the radial direction line extends, (5) calculating a mean value of the index values $\cos \theta il$ having been calculated for the picture elements, which are located along each of the radial direction lines and fall within the range from a starting point to an end point, the starting point being set at the picture element of interest, the end point being set at one of the picture elements that are located between a position at a length of distance corresponding to the minimum size of the prospective abnormal pattern to be detected and the position at the length of distance corresponding to the maximum size of the prospective abnormal pattern to be detected, a plurality of the mean values being obtained for each of the radial direction lines by successively setting the end point at the picture elements, (6) calculating the maximum value of the mean values of the index values $\cos \theta il$, which mean values have been obtained for each of the radial direction lines by successively setting the end point at the picture elements, (7) calculating a total sum of the maximum values, which have been obtained for all of the plurality of the radial direction lines, a value of the degree of centralization of the gradient vector group with respect to the picture element of interest being thereby calculated, (8) comparing the value of the degree of centralization of the gradient vector group, which value has been calculated by the operation of step (7) defined above, and a predetermined threshold value with each other, (9) judging that the picture element of interest is located within the region of the prospective abnormal pattern in cases where the value of the degree of centralization of the gradient vector group is not smaller than the predetermined threshold value, and judging that the picture element of interest is not located within the region of the prospective abnormal pattern in cases where the value of the degree of centralization of the gradient vector group is less than the predetermined threshold value,

(10) successively setting the picture element of interest at all of the picture elements in the radiation image, repeating the operations of steps (3) to (9) defined above, and making judgments as to whether the respective picture elements are or are not located within the region of the prospective abnormal pattern,

(11) calculating the center of gravity on a region constituted of the picture elements, which have been judged as being located within the region of the prospective abnormal pattern,

(12) taking a picture element corresponding to the position, at which the center of gravity is located, as the picture element of interest, and thereby specifying a picture element corresponding to the end point that is associated with the mean value of the index values $\cos \theta il$ having been calculated for each of the radial direction lines, which mean value takes the maximum value in the operation of step (6) defined above,

(13) setting the specified picture element, which corresponds to the end point on each of the radial direction lines, as a marginal point of the region of the prospective abnormal pattern in the direction along which the radial direction line extends, a plurality of the marginal points being thereby set on the plurality of the radial direction lines, and

(14) connecting the adjacent marginal points, which have been set on the plurality of the radial direction lines, by predetermined lines, the region surrounded by the connecting lines being extracted as the prospective abnormal pattern.

In the operation of step (14) defined above, the marginal points may be connected by straight lines or non-linear curves. Alternatively, dynamic contour extracting techniques may be employed, wherein a dynamic curve having an initial shape repeats deformation in accordance with a predetermined deformation tendency and converges, and discretely set marginal points are thereby connected smoothly by the dynamic curve.

In the dynamic contour extracting techniques, an imaginary curve (hereinbelow referred to as the dynamic curve), which repeats deformation in accordance with the predetermined deformation tendency, is set as a model of the contour to be extracted. The tendency of deformation is determined such that the contour model may become close to a target contour, i.e. such that the dynamic curve may repeat deformation and may ultimately converge to the target contour. In this manner, the target contour is extracted.

As one of the dynamic contour extracting techniques, a snakes model has heretofore been known. In the snakes model, the tendency of deformation is determined by defining energy of the dynamic curve and quantitatively rating the state of the dynamic curve. The energy of the dynamic curve is defined such that the level of energy may become minimum when the dynamic curve coincides with the target contour. The target contour can be extracted by finding the stable state, in which the level of energy of the dynamic curve becomes minimum. The speed and the accuracy, with which the contour extracting processing is carried out, depend upon how the tendency of deformation is determined. (The snakes model is described in, for example, "SNAKES: ACTIVE CONTOUR MODELS" by M. Kass, A. Witkin, D. Terzopoulos, International Journal of Computer Vision, Vol. 1, No. 4, pp. 321–331, 1988.)

In cases where the snakes model, which is one of the dynamic contour extracting techniques, is employed as a technique for connecting the marginal points, the marginal points on the radial direction lines can be connected smoothly, and the actual contour of the prospective abnormal pattern can be extracted accurately.

In the aforesaid first process for the detection of the prospective abnormal pattern, the starting point is set at the picture element of interest. A second process for the detection of the prospective abnormal pattern, which is described below, is the same as the first process for the detection of the prospective abnormal pattern, except that the starting point is set at a picture element located at a length of distance corresponding to the minimum size of the prospective abnormal pattern to be detected, which length of distance is taken from the picture element of interest.

Specifically, in the first and second methods of detecting a prospective abnormal pattern in accordance with the present invention, the detection of the prospective abnormal pattern may be carried out with a second process comprising the steps of:

(1) for each picture element among all of the picture elements in the one radiation image of the mamma, which is represented by the one image signal, calculating a gradient vector of the image signal, (2) setting an arbitrary picture element, which is among all of the picture elements in the radiation image, as a picture element of interest, (3) setting a plurality of radial direction lines on the radiation image, the radial direction lines extending radially from the picture element of interest and being adjacent to one another at predetermined angle intervals, (4) calculating an index value $\cos \theta il$ for each picture element among the picture elements, which are located along each of the radial direction lines and fall within the range from a picture element that is located at a length of distance corresponding to the minimum size of the prospective abnormal pattern to be detected, the length of distance being taken from the picture element of interest, to a picture element that is located at a length of distance corresponding to the maximum size of the prospective abnormal pattern to be detected, the length of distance being taken from the picture element of interest, the index value $\cos \theta il$ being calculated from an angle $\theta il$ that is made between the gradient vector, which has been calculated for each picture element, and the direction along which the radial direction line extends, (5) calculating a mean value of the index values $\cos \theta il$ having been calculated for the picture elements, which are located along each of the radial direction lines and fall within the range from a starting point to an end point, the starting point being set at the picture element that is located at the length of distance corresponding to the minimum size of the prospective abnormal pattern to be detected, the end point being set at one of the picture elements that are located between the position at the length of distance corresponding to the minimum size of the prospective abnormal pattern to be detected and the position at the length of distance corresponding to the maximum size of the prospective abnormal pattern to be detected, a plurality of the mean values being obtained for each of the radial direction lines by successively setting the end point at the picture elements, (6) calculating the maximum value of the mean values of the index values $\cos \theta il$, which mean values have been obtained for each of the radial direction lines by successively setting the end point at the picture elements, (7) calculating a total sum (or a mean value) of the maximum values, which have been obtained for all of the plurality of the radial direction lines, a value of the degree of centralization of the gradient vector group with respect to the picture element of interest being thereby calculated, (8) comparing the value of the degree of centralization of the gradient vector group, which value has been calculated by the operation of step (7) defined above, and a predetermined threshold value with each other, (9) judging that the picture element of interest is located within the region of the prospective abnormal pattern in cases where the value of the degree of centralization of the gradient vector group is not smaller than the predetermined threshold value, and judging that the picture element of interest is not located within the region of the prospective abnormal pattern in cases where the value of the degree of centralization of the gradient vector group is less than the predetermined threshold value,

(10) successively setting the picture element of interest at all of the picture elements in the radiation image, repeating the operations of steps (3) to (9) defined above, and making judgments as to whether the respective picture elements are or are not located within the region of the prospective abnormal pattern,

(11) calculating the center of gravity on a region constituted of the picture elements, which have been judged as being located within the region of the prospective abnormal pattern,

(12) taking a picture element corresponding to the position, at which the center of gravity is located, as the picture element of interest, and thereby specifying a picture element corresponding to the end point that is associated with the mean value of the index values $\cos \theta il$ having been calculated for each of the radial direction lines, which mean value takes the maximum value in the operation of step (6) defined above,

(13) setting the specified picture element, which corresponds to the end point on each of the radial direction lines, as a marginal point of the region of the prospective abnormal pattern in the direction along which the radial direction line extends, a plurality of the marginal points being thereby set on the plurality of the radial direction lines, and

(14) connecting the adjacent marginal points, which have been set on the plurality of the radial direction lines, by predetermined lines, the region surrounded by the connecting lines being extracted as the prospective abnormal pattern.

In the second process for the detection of the prospective abnormal pattern, in the operation of step (14) defined above, the marginal points may be connected by straight lines or non-linear curves. Alternatively, the dynamic contour extracting techniques, such as the snakes model, may be employed, wherein a dynamic curve having an initial shape repeats deformation in accordance with a predetermined deformation tendency and converges, and discretely set marginal points are thereby connected smoothly by the dynamic curve.

The present invention further provides an apparatus for carrying out the first method of detecting a prospective abnormal pattern in accordance with the present invention. Specifically, the present invention further provides a first apparatus for detecting a prospective abnormal pattern, in which an image signal representing a radiation image of the right mamma of an object and an image signal representing a radiation image of the left mamma of the object are obtained, each of the image signals being made up of a series of image signal components representing picture elements in the radiation image, and a prospective abnormal pattern is detected from one of the radiation images of the right and left mammae in accordance with the image signals, the apparatus comprising:

(a) a detection means for detecting the prospective abnormal pattern in accordance with one of the image signals representing the radiation images of the right and left mammae, (b) a region setting means for setting a region of the detected prospective abnormal pattern in one radiation image, which is represented by the one image signal, and a region in the other mamma radiation image, which region corresponds to the position of the region of the detected prospective abnormal pattern in the one radiation image, (c) an iris filter processing means for carrying out iris filter processing on image signal components, which represent picture elements located in the region of the detected prospective abnormal pattern in the one radiation image, and on image signal components, which represent picture elements located in the region in the other mamma radiation image, iris filter output signals being thereby obtained, (d) a difference value calculating means for calculating a difference value between the iris filter output signals, which have been obtained with respect to corresponding picture elements in the regions, and (e) a definite prospective abnormal pattern detecting means for detecting a definite prospective abnormal pattern in accordance with the difference value having been calculated by the difference value calculating means.

The present invention still further provides an apparatus for carrying out the second method of detecting a prospective abnormal pattern in accordance with the present invention. Specifically, the present invention still further provides a second apparatus for detecting a prospective abnormal pattern, in which an image signal representing a radiation image of the right mamma of an object and an image signal representing a radiation image of the left mamma of the object are obtained, each of the image signals being made up of a series of image signal components representing picture elements in the radiation image, and a prospective abnormal pattern is detected from one of the radiation images of the right and left mammae in accordance with the image signals, the apparatus comprising:

(a) a detection means for detecting the prospective abnormal pattern in accordance with one of the image signals representing the radiation images of the right and left mammae, (b) a region setting means for setting a region of the detected prospective abnormal pattern in one radiation image, which is represented by the one image signal, and a region in the other mamma radiation image, which region corresponds to the position of the region of the detected prospective abnormal pattern in the one radiation image, (c) an iris filter processing means for carrying out iris filter processing on image signal components, which represent picture elements located in the region of the detected prospective abnormal pattern in the one radiation image, and on image signal components, which represent picture elements located in the region in the other mamma radiation image, iris filter output signals being thereby obtained, (d) a difference value calculating means for calculating a difference value between the iris filter output signals, which have been obtained with respect to corresponding picture elements in the regions, (e) a rating function value calculating means for calculating a rating function value, which represents a degree of malignancy of the detected prospective abnormal pattern, in accordance with the image signal components, which represent the picture elements located in the region of the detected prospective abnormal pattern in the one radiation image, and (f) a definite prospective abnormal pattern detecting means for detecting a definite prospective abnormal pattern in accordance with the rating function value, which has been calculated by the rating function value calculating means, and the difference value, which has been calculated by the difference value calculating means.

In the first and second apparatuses for detecting a prospective abnormal pattern in accordance with the present invention, the detection means should preferably comprise:

(i) a gradient vector calculating means for calculating a gradient vector of the image signal, the calculation being made for each picture element among all of the picture elements in the one radiation image of the mamma, which is represented by the one image signal, (ii) a picture-element-of-interest setting means for setting an arbitrary picture element, which is among all of the picture elements in the radiation image, as a picture element of interest, the picture elements being successively set as the picture element of interest, (iii) a detection size setting means for setting the minimum size and the maximum size of the prospective abnormal pattern to be detected, (iv) a direction line setting means for setting a plurality of radial direction lines on the radiation image, the radial direction lines extending radially from the picture element of interest and being adjacent to one another at predetermined angle intervals, (v) an index value calculating means for calculating an index value $\cos\theta il$ for each picture element among the picture elements, which are located along each of the radial direction lines and fall within the range from the picture element of interest to a picture element that is located at a length of distance corresponding to the maximum size of the prospective abnormal pattern to be detected, the index value $\cos\theta il$ being calculated from an angle $\theta il$ that is made between the gradient vector, which has been calculated for each picture element, and the direction along which the radial direction line extends, (vi) a maximum value calculating means for calculating a mean value of the index values $\cos\theta il$ having been calculated for the picture elements, which are located along each of the radial direction lines and fall within the range from a starting point to an end point, the starting point being set at the picture element of interest, the end point being set at one of the picture elements that are located between a position at a length of distance corresponding to the minimum size of the prospective abnormal pattern to be detected and the position at the length of distance corresponding to the maximum size of the prospective abnormal pattern to be detected, a plurality of the mean values being obtained for each of the radial direction lines by successively setting the end point at the picture elements, the maximum value calculating means extracting the maximum value of the mean values of the index values cos θil, which mean values have been obtained for each of the radial direction lines by successively setting the end point at the picture elements, (vii) a centralization degree calculating means for calculating a total sum of the maximum values, which have been obtained for all of the plurality of the radial direction lines, and thereby calculating a value of the degree of centralization of the gradient vector group with respect to the picture element of interest, (viii) a comparison and judgment means for comparing the value of the degree of centralization of the gradient vector group, which value has been calculated by the centralization degree calculating means, and a predetermined threshold value with each other, the comparison and judgment means judging that the picture element of interest is located within the region of the prospective abnormal pattern in cases where the value of the degree of centralization of the gradient vector group is not smaller than the predetermined threshold value, and judging that the picture element of interest is not located within the region of the prospective abnormal pattern in cases where the value of the degree of centralization of the gradient vector group is less than the predetermined threshold value, (ix) a center-of-gravity calculating means for calculating the center of gravity on a region constituted of the picture elements, which have been judged as being located within the region of the prospective abnormal pattern, (x) a marginal point setting means for taking a picture element corresponding to the position, at which the center of gravity is located, as the picture element of interest, and thereby specifying a picture element corresponding to the end point that is associated with the maximum value having been extracted by the maximum value calculating means, the picture element corresponding to the end point being specified with respect to each of the radial direction lines, the marginal point setting means setting the specified picture element, which corresponds to the end point on each of the radial direction lines, as a marginal point of the region of the prospective abnormal pattern in the direction along which the radial direction line extends, a plurality of the marginal points being thereby set on the plurality of the radial direction lines, and (xi) a contour extracting means for connecting the adjacent marginal points, which have been set on the plurality of the radial direction lines, by predetermined lines, and extracting the region, which is surrounded by the connecting lines, as the prospective abnormal pattern.

Also, in the first and second apparatuses for detecting a prospective abnormal pattern in accordance with the present invention, the detection means should preferably comprise:

(i) a gradient vector calculating means for calculating a gradient vector of the image signal, the calculation being made for each picture element among all of the picture elements in the one radiation image of the mamma, which is represented by the one image signal, (ii) a picture-element-of-interest setting means for setting an arbitrary picture element, which is among all of the picture elements in the radiation image, as a picture element of interest, the picture elements being successively set as the picture element of interest, (iii) a detection size setting means for setting the minimum size and the maximum size of the prospective abnormal pattern to be detected, (iv) a direction line setting means for setting a plurality of radial direction lines on the radiation image, the radial direction lines extending radially from the picture element of interest and being adjacent to one another at predetermined angle intervals, (v) an index value calculating means for calculating an index value cos θil for each picture element among the picture elements, which are located along each of the radial direction lines and fall within the range from a picture element that is located at a length of distance corresponding to the minimum size of the prospective abnormal pattern to be detected, the length of distance being taken from the picture element of interest, to a picture element that is located at a length of distance corresponding to the maximum size of the prospective abnormal pattern to be detected, the length of distance being taken from the picture element of interest, the index value cos θil being calculated from an angle θil that is made between the gradient vector, which has been calculated for each picture element, and the direction along which the radial direction line extends, (vi) a maximum value calculating means for calculating a mean value of the index values cos θil having been calculated for the picture elements, which are located along each of the radial direction lines and fall within the range from a starting point to an end point, the starting point being set at the picture element that is located at the length of distance corresponding to the minimum size of the prospective abnormal pattern to be detected, the end point being set at one of the picture elements that are located between the position at the length of distance corresponding to the minimum size of the prospective abnormal pattern to be detected and the position at the length of distance corresponding to the maximum size of the prospective abnormal pattern to be detected, a plurality of the mean values being obtained for each of the radial direction lines by successively setting the end point at the picture elements, the maximum value calculating means extracting the maximum value of the mean values of the index values cos θil, which mean values have been obtained for each of the radial direction lines by successively setting the end point at the picture elements, (vii) a centralization degree calculating means for calculating a total sum of the maximum values, which have been obtained for all of the plurality of the radial direction lines, and thereby calculating a value of the degree of centralization of the gradient vector group with respect to the picture element of interest, (viii) a comparison and judgment means for comparing the value of the degree of centralization of the gradient vector group, which value has been calculated by the centralization degree calculating means, and a predetermined threshold value with each other, the comparison and judgment means judging that the picture element of interest is located within the region of the prospective abnormal pattern in cases where the value of the degree of centralization of the gradient vector group is not smaller than the predetermined threshold value, and judging that the picture element of interest is not located within the region of the prospective abnormal pattern in cases where the value of the degree of centralization of the gradient vector group is less than the predetermined threshold value, (ix) a center-of-gravity calculating means for calculating the center of gravity on a region constituted of the picture elements, which have been judged as being located within the region of the prospective abnormal pattern, (x) a marginal point setting means for taking a picture element corresponding to the position, at which the center of gravity is located, as the picture element of interest, and thereby specifying a picture element corresponding to the end point that is associated with the maximum value having been extracted by the maximum value calculating means, the picture element corresponding to the end point being specified with respect to each of the radial direction lines, the marginal point setting means setting the specified picture element, which corresponds to the end point on each of the radial direction lines, as a marginal point of the region of the prospective abnormal pattern in the direction along which the radial direction line extends, a plurality of the marginal points being thereby set on the plurality of the radial direction lines, and (xi) a contour extracting means for connecting the adjacent marginal points, which have been set on the plurality of the radial direction lines, by predetermined lines, and extracting the region, which is surrounded by the connecting lines, as the prospective abnormal pattern.

There is little probability of tumors occurring simultaneously at corresponding positions in the right and left mammae. Therefore, there is little probability that, in cases where a prospective abnormal pattern is detected in the radiation image of one of the right and left mammae of an object, a prospective abnormal pattern will occur also at the corresponding position in the radiation image of the other mamma of the object. With the first method and apparatus for detecting a prospective abnormal pattern in accordance with the present invention, the prospective abnormal pattern is detected in accordance with one of the image signals representing the radiation images of the right and left mammae. Also, the region, in which the detected prospective abnormal pattern is located, in the one mamma radiation image, and the region in the other mamma radiation image, which region corresponds to the position of the region of the detected prospective abnormal pattern in the one radiation image, are set. The iris filter processing is carried out on the image signal components, which represent picture elements located in the region of the detected prospective abnormal pattern in the one radiation image, and on the image signal components, which represent picture elements located in the region in the other mamma radiation image. The iris filter output signals are thus calculated for the respective regions, and the difference value between the iris filter output signals is calculated. In cases where the prospective abnormal pattern is embedded in one of the regions, there is little probability that a prospective abnormal pattern will also be embedded in the other region. Therefore, in such cases, the calculated difference value is comparatively large, and it can be regarded that there is a strong possibility of the detected prospective abnormal pattern being the true abnormal pattern. In cases where the calculated difference value is comparatively small, it can be judged that there is a strong possibility of the detected prospective abnormal pattern being a false positive, such as noise. Therefore, the definite prospective abnormal pattern is detected in accordance with the difference value, and the prospective abnormal pattern can thereby be detected accurately.

With the second method and apparatus for detecting a prospective abnormal pattern in accordance with the present invention, the rating function value, which represents the degree of malignancy of the detected prospective abnormal pattern, is calculated. The difference value between the iris filter output signals is weighted with the rating function value. In this manner, a prospective abnormal pattern, which has a strong probability of being an abnormal pattern, is weighted more strongly. Therefore, only the prospective abnormal pattern, which has a strong probability of being an abnormal pattern, can be detected accurately.

BRIEF DESCRIPTION OF THE DRAWINGS

FIG. 2 is a block diagram showing an example of a computer aided medical image diagnosing apparatus, in which the prospective abnormal pattern detecting apparatus of FIG. 1 is employed, FIG. 9 is an explanatory view showing a mask, which is used for calculating gradient vectors in iris filter processing, FIG. 11A is an explanatory view showing examples of output values, which are obtained from iris filter processing, and a threshold value T, FIG. 11B is an explanatory view showing regions, which are extracted by threshold value processing carried out on the output values of the iris filter processing, FIG. 11C is an explanatory view showing how marginal points of a region of a prospective abnormal pattern are set, FIG. 17 is an explanatory view showing a simultaneous formation matrix.

DESCRIPTION OF THE PREFERRED EMBODIMENTS

The present invention will hereinbelow be described in further detail with reference to the accompanying drawings.

Figure 1:
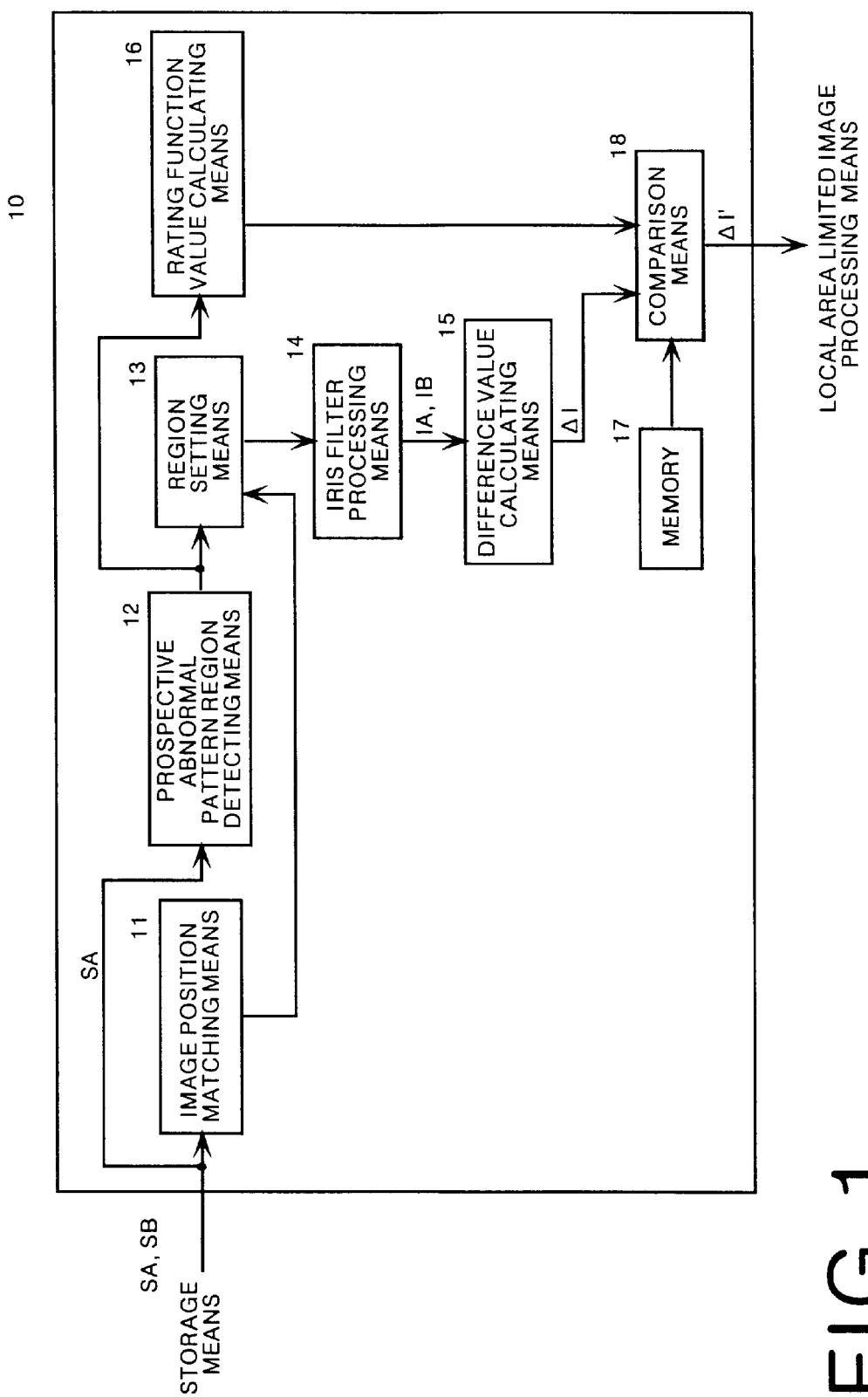
FIG. 1 is a schematic block diagram showing an embodiment of the apparatus for detecting a prospective abnormal pattern in accordance with the present invention.

FIG. 1 is a schematic block diagram showing an embodiment of the apparatus for detecting a prospective abnormal pattern in accordance with the present invention. FIG. 2 is a block diagram showing an example of a computer aided medical image diagnosing apparatus, in which the prospective abnormal pattern detecting apparatus of FIG. 1 is employed.

With reference to FIG. 2, a computer aided medical image diagnosing apparatus 100 comprises a storage means 20 for storing a received image signal (hereinbelow referred to as the entire area image signal) S, and an entire area image processing means 30 for reading out the entire area image signal S from the storage means 20 and carrying out image processing, such as gradation processing or frequency processing, on the entire area image signal S. The computer aided medical image diagnosing apparatus 100 also comprises a prospective abnormal pattern detecting apparatus 10 for reading out the entire area image signal S from the storage means 20 and extracting an image signal (hereinbelow referred to as the local area limited image signal), which represents a prospective abnormal pattern (a prospective tumor pattern), from the entire area image signal S. The computer aided medical image diagnosing apparatus 100 further comprises a local area limited image processing means 40 for carrying out emphasis processing on the extracted local area limited image signal in order to emphasize the extracted prospective abnormal pattern. The computer aided medical image diagnosing apparatus 100 still further comprises a displaying means 50 for displaying the entire area image, which has been obtained from the image processing carried out by the entire area image processing means 30, and the prospective abnormal pattern, which has been obtained from the image processing carried out by the local area limited image processing means 40, as a visible image.

Figure 3A:
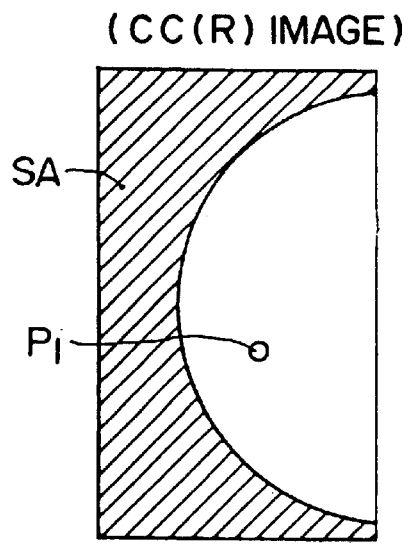
FIG. 3A is an explanatory view showing a vertical-direction recorded image [CC(R) image] of the right mamma of a patient, the image having been recorded by sandwiching the right mamma from above and below.
Figure 3B:
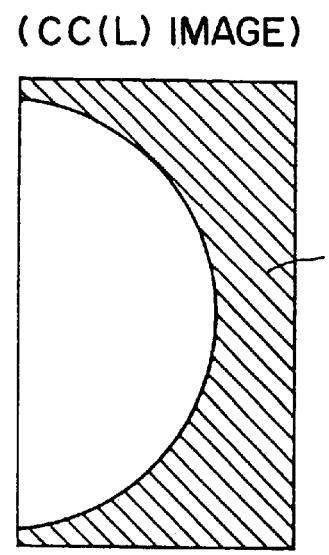
FIG. 3B is an explanatory view showing a vertical-direction recorded image [CC(L) image] of the left mamma of the patient.

By way of example, as illustrated in FIG. 3A, an image, which represents a mammogram of the right mamma of a patient, is stored on a stimulable phosphor sheet. Also, as illustrated in FIG. 3B, an image, which represents a mammogram of the left mamma of the same patient, is stored on a stimulable phosphor sheet. Each of the stimulable phosphor sheets, on which the images representing the mammograms of the right and left mammae of the patient have been stored, is then exposed to stimulating rays, which cause the stimulable phosphor sheet to emit light in proportion to the amount of energy stored thereon during its exposure to radiation. The emitted light is photoelectrically detected, and the thus obtained image signal is converted into a digital image signal. In this manner, two digital image signals (the image signals of a high image signal level for a high image density) SA and SB are obtained. Each of the digital image signals SA and SB is fed as the entire area image signal S into the computer aided medical image diagnosing apparatus 100. FIG. 3A shows a vertical-direction recorded image [CC(R) image] of the right mamma of the patient, the image having been recorded by sandwiching the right mamma from above and below. FIG. 3B shows a vertical-direction recorded image [CC(L) image] of the left mamma of the patient. In the CC(R) image, a tumor pattern $P_1$ is embedded.

Figure 4:
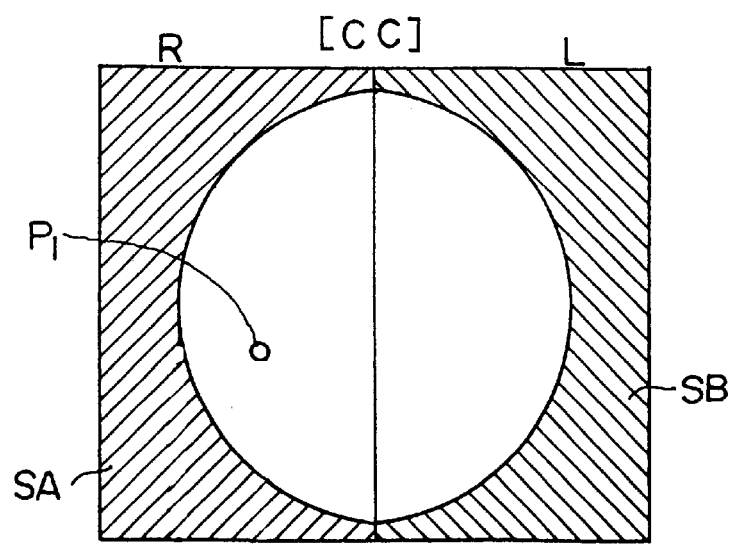
FIG. 4 is an explanatory view showing the CC(R) image and the CC(L) image of the same patient combined back to back with each other.

The displaying means 50 displays the CC(R) image and the CC(L) image of the same patient such that they may be combined back to back with each other as illustrated in FIG. 4.

With the displaying means 50, the entire area image and the prospective abnormal pattern may be independently displayed on the displaying screen. However, in this embodiment, the entire area image is displayed, and the image portion corresponding to the prospective abnormal pattern in the entire area image is replaced by the prospective abnormal pattern, which has been obtained from the image processing carried out by the local area limited image processing means 40.

As illustrated in FIG. 1 in detail, the prospective abnormal pattern detecting apparatus 10 comprises an image position matching means 11 for matching the positions of the images, which are represented by the entire area image signals SA and SB, with each other, and a prospective abnormal pattern region detecting means 12 for detecting the region of the prospective abnormal pattern in accordance with the entire area image signal SA as will be described later. The prospective abnormal pattern detecting apparatus 10 also comprises a region setting means 13 for setting the region, which has been detected by the prospective abnormal pattern region detecting means 12, in the entire area image, which is represented by the entire area image signal SA, and in the entire area image, which is represented by the entire area image signal SB. The prospective abnormal pattern detecting apparatus 10 further comprises an iris filter processing means 14 for carrying out iris filter processing, which will be described later, on image signal components of the entire area image signal SA, which represent picture elements located in the region having been set by the region setting means 13, and on image signal components of the entire area image signal SB, which represent picture elements located in the region having been set by the region setting means 13. From the iris filter processing, iris filter output signals IA and IB are obtained. The prospective abnormal pattern detecting apparatus 10 still further comprises a difference value calculating means 15 for calculating a difference value ΔI between the iris filter output signals IA and IB. The prospective abnormal pattern detecting apparatus 10 also comprises a rating function value calculating means 16 for calculating a rating function value, which represents a degree of malignancy of the prospective abnormal pattern, in accordance with the image signal components of the entire area image signal SA, which represent the picture elements located in the region having been set by the region setting means 13. The prospective abnormal pattern detecting apparatus 10 further comprises a memory 17, which stores an initially set threshold value T0, and a comparison means 18. The comparison means 18 weights the difference value ΔI, which has been calculated by the difference value calculating means 15, with the rating function value, which has been calculated by the rating function value calculating means 16. A weighted difference value ΔI' is thereby obtained. The comparison means 18 then compares the weighted difference value ΔI' and the threshold value T0 with each other. In cases where the weighted difference value ΔI' is larger than the threshold value T0, the comparison means 18 extracts the region, which is associated with the weighted difference value ΔI', as a definite prospective abnormal pattern.

Figure 5A:
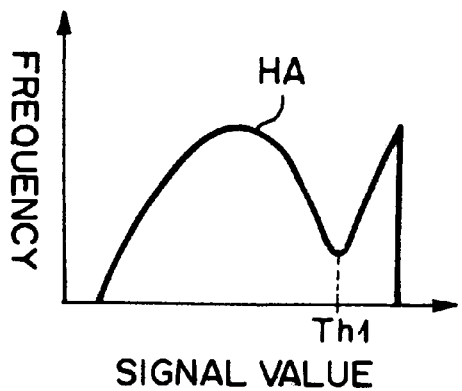
FIG. 5A is a graph showing a histogram of an entire area image signal SA.
Figure 5B:
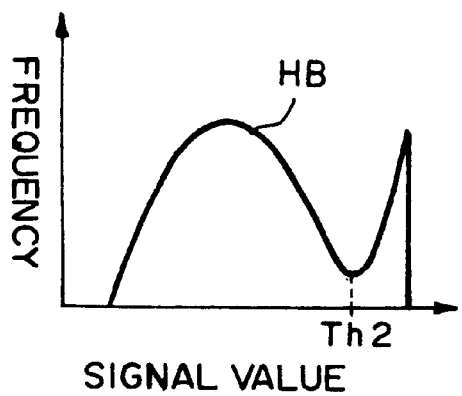
FIG. 5B is a graph showing a histogram of an entire area image signal SB.
Figure 6:
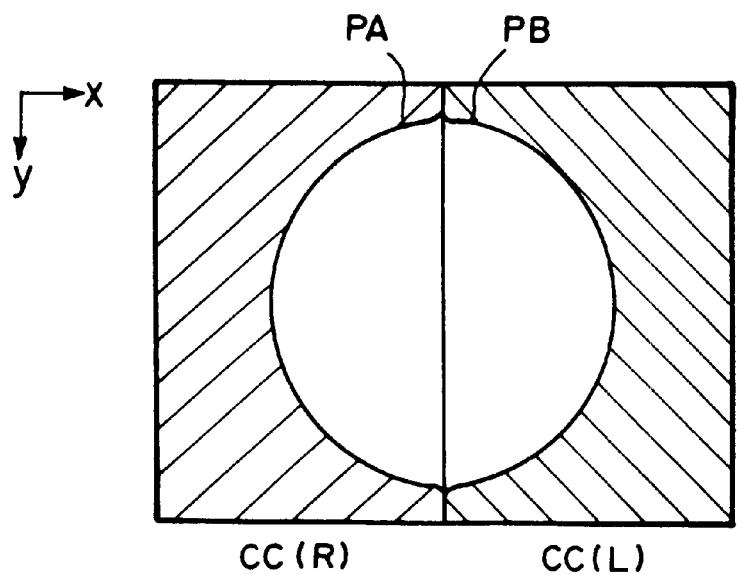
FIG. 6 is an explanatory graph showing how the positions of object image portions, which are embedded in entire area images, are matched with each other.

As illustrated in FIGS. 5A and 5B, the image position matching means 11 forms a histogram HA of the entire area image signal SA and a histogram of the entire area image signal SB. The image position matching means 11 carries out binarizing processing on the histogram HA and with a threshold value Th1, which represents a boundary between an object image portion and a background region (i.e., a region that was exposed directly to radiation in the image recording operation) in the CC(R) image. Also, the image position matching means 11 carries out binarizing processing on the histogram HB and with a threshold value Th2, which represents a boundary between an object image portion and a background region in the CC(L) image. As illustrated in FIG. 6, each of the CC(R) image and the CC(L) image is thereby separated into the object image portion and the background region (hatched in FIG. 6). The image position matching means 11 then calculates top positions PA and PB of the object image portions and matches the positions of the CC(R) image and the CC(L) image with each other such that the top positions PA and PB may coincide with each other. In such cases, by way of example, the top position PA is set as the origin of a coordinate system, which represent coordinate values of each of the picture elements in the CC(R) image. Also, the top position PB is set as the origin of a coordinate system, which represent coordinate values of each of the picture elements in the CC(L) image.

In cases where a prospective abnormal pattern has been detected by the prospective abnormal pattern region detecting means 12 and in accordance with the entire area image signal SA, which represents the entire area image of the right mamma, the region setting means 13 sets a region in the other entire area image (i.e., the image represented by the entire area image signal SB), which region corresponds to the region of the prospective abnormal pattern in the entire area image of the right mamma. In such cases, since the positions of the two entire area images have been matched with each other by the image position matching means 11, the boundary line between the two entire area images is taken as the axis of symmetry, and the coordinates of the region of the prospective abnormal pattern in the image represented by the entire area image signal SA are set in the image represented by the entire area image signal SB. In this manner, the region of the prospective abnormal pattern and the corresponding region are set in the two entire area images.

In the rating function value calculating means 16, the Mahalanobis distance described above is employed as the rating function value.

Figure 7:
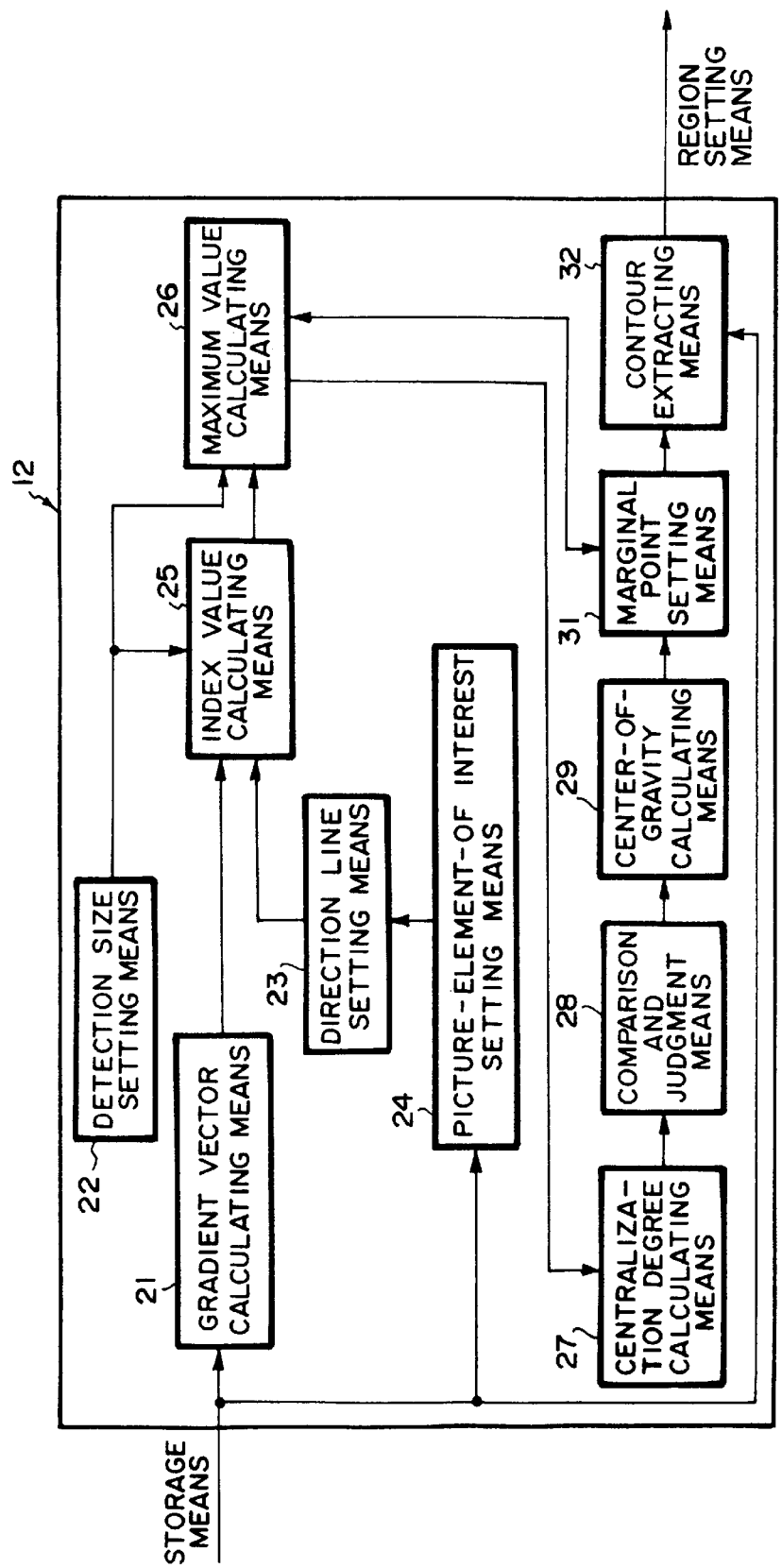
FIG. 7 is a schematic block diagram showing a prospective abnormal pattern region detecting means.
Figure 10:
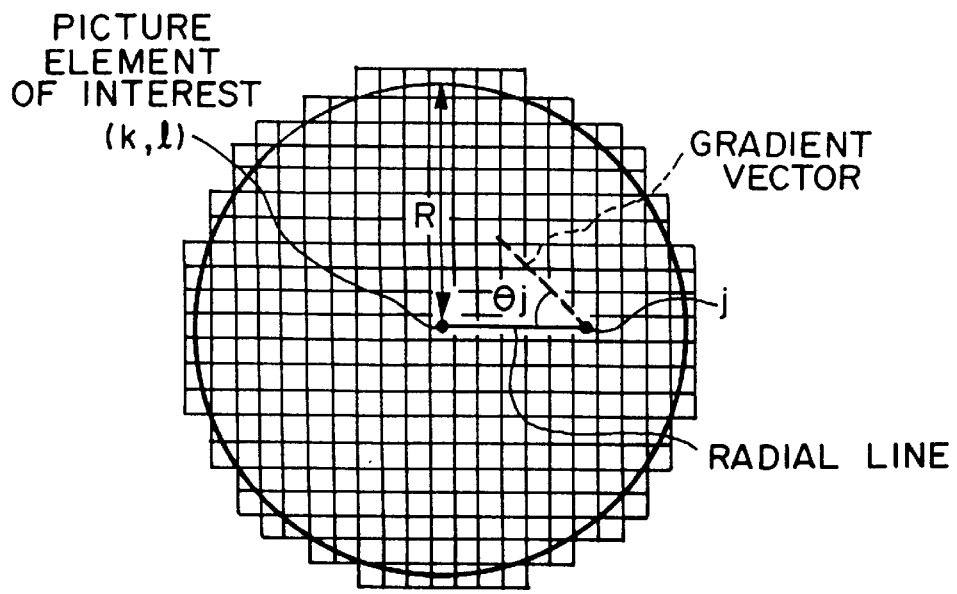
FIG. 10 is an explanatory view showing the concept behind the degree of centralization of a gradient vector with respect to a picture element of interest.
Figure 8:
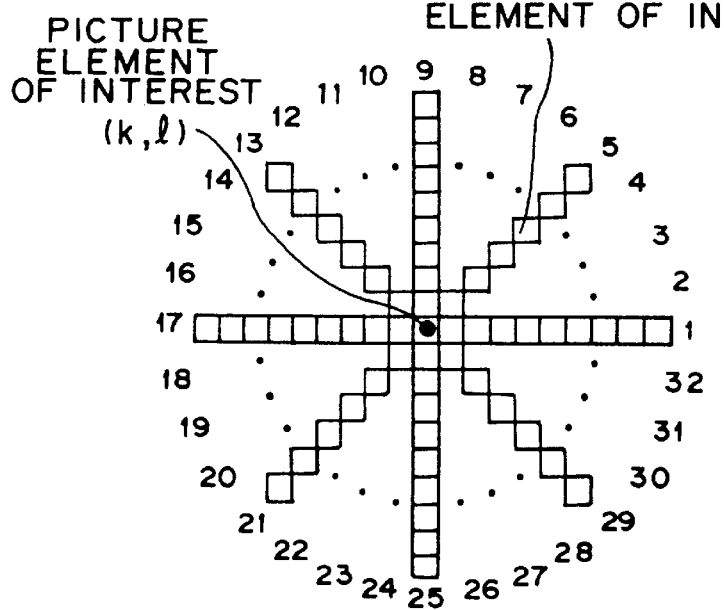
FIG. 8 is an explanatory view showing the concept behind an iris filter, which is set such that a contour shape may change adaptively.

As illustrated in FIG. 7 in detail, the prospective abnormal pattern region detecting means 12 comprises a gradient vector calculating means 21 for calculating an image density gradient vector of the received entire area image signal SA, the calculation being made for each picture element among all of the picture elements in the radiation image represented by the received image signal SA. The prospective abnormal pattern region detecting means 12 also comprises a picture-element-of-interest setting means 24 for setting an arbitrary picture element, which is among all of the picture elements in the radiation image, as a picture element of interest, the picture elements being successively set as the picture element of interest, and a detection size setting means 22 for setting the minimum size (a radius Rmin) and the maximum size (a radius Rmax) of the prospective tumor pattern to be detected. The prospective abnormal pattern region detecting means 12 further comprises a direction line setting means 23 for setting a plurality of (e.g., 32) radial direction lines (as illustrated in FIG. 8) on the radiation image, the radial direction lines extending radially from the picture element of interest, which has been set by the picture-element-of-interest setting means 24, and being adjacent to one another at predetermined angle intervals (e.g., at intervals of 11.25 degrees). The prospective abnormal pattern region detecting means 12 still further comprises an index value calculating means 25 for calculating an index value $\cos\theta_{il}$ for each picture element among the picture elements, which are located along each of the radial direction lines and fall within the range from the picture element of interest to a picture element that is located at a length of distance corresponding to the maximum size Rmax of the prospective tumor pattern to be detected. The index value $\cos\theta_{il}$ is calculated from an angle $\theta_{il}$ that is made between the gradient vector, which has been calculated for each picture element, and the direction along which the radial direction line extends. (The angle $\theta_{il}$ represents the angle that is made between the gradient vector, which has been calculated for an l'th picture element, as counted from the picture element of interest, on an i'th radial direction line among the 32 radial direction lines, and the direction along which the i'th radial direction line extends.) The prospective abnormal pattern region detecting means 12 also comprises a maximum value calculating means 26 for calculating a mean value Ci(n) of the index values $\cos\theta_{il}$ having been calculated for the picture elements, which are located along each of the radial direction lines and fall within the range from a starting point to an end point, the starting point being set at the picture element of interest, the end point being set at one of the picture elements that are located between a position at a length of distance corresponding to the minimum size Rmin of the prospective tumor pattern to be detected and the position at the length of distance corresponding to the maximum size Rmax of the prospective tumor pattern to be detected. The mean value Ci(n) is calculated with Formula (5) shown below, and a plurality of the mean values Ci(n) are obtained for each of the radial direction lines by successively setting the end point at the picture elements. Also, the maximum value calculating means 26 extracts the maximum value Cimax of the mean values Ci(n) of the index values $\cos\theta_{il}$, which mean values have been obtained for each of the radial direction lines by successively setting the end point at the picture elements. The maximum value Cimax is extracted with Formula (6) shown below. The prospective abnormal pattern region detecting means 12 further comprises a centralization degree calculating means 27 for calculating an arithmetic mean value, (ΣCimax)/32, of the maximum values Cimax, which have been obtained for all of the 32 radial direction lines, and thereby calculating a value C of the degree of centralization of the gradient vector group with respect to the picture element of interest. The value C is calculated with Formula (7) shown below.

$$Ci(n) = \sum_{i=1}^{n} \{(\cos\theta_{il})/n\}, \; Rmin \leq n \leq Rmax \tag{5}$$

$$Ci_{\max} = \max_{Rmin \leq n \leq Rmax} Ci(n) \tag{6}$$

$$C = (1/32)\sum_{i=1}^{32} Ci_{\max} \tag{7}$$

The prospective abnormal pattern region detecting means 12 still further comprises a comparison and judgment means 28 for comparing the value C of the degree of centralization of the gradient vector group, which value has been calculated by the centralization degree calculating means 27, and a predetermined threshold value T with each other. In cases where the value C of the degree of centralization of the gradient vector group is not smaller than the predetermined threshold value T, the comparison and judgment means 28 judges that the picture element of interest is located within the region of the prospective tumor pattern. In cases where the value C of the degree of centralization of the gradient vector group is less than the predetermined threshold value T, the comparison and judgment means 28 judges that the picture element of interest is not located within the region of the prospective tumor pattern. The prospective abnormal pattern region detecting means 12 also comprises a center-of-gravity calculating means 29 for calculating the center of gravity on a region constituted of the picture elements, which have been judged as being located within the region of the prospective tumor pattern as a result of the operations for successively setting the picture element of interest at all of the picture elements in the radiation image by the picture-element-of-interest setting means 24 and for making judgments with respect to all of the picture elements in the radiation image by the comparison and judgment means 28. The prospective abnormal pattern region detecting means 12 further comprises a marginal point setting means 31 for taking a picture element corresponding to the position, at which the center of gravity is located, as the picture element of interest, and thereby specifying a picture element corresponding to the end point that is associated with the maximum value having been extracted by the maximum value calculating means 26, the picture element corresponding to the end point being specified with respect to each of the radial direction lines. Also, the marginal point setting means 31 sets the specified picture element, which corresponds to the end point on each of the radial direction lines, as a marginal point of the region of the prospective tumor pattern in the direction along which the radial direction line extends. A plurality of the marginal points are thereby set on the plurality of the radial direction lines. The prospective abnormal pattern region detecting means 12 still further comprises a contour extracting means 32 for connecting the adjacent marginal points, which have been set on the plurality of the radial direction lines, by predetermined non-linear curves in accordance with the dynamic contour extracting technique, and extracting the region, which is surrounded by the connecting curves, as the prospective tumor pattern.

Specifically, as illustrated in FIG. 9, the gradient vector calculating means 21 sets a mask, which has a size of, for example, five picture elements (located along the column direction of the picture element array)×five picture elements (located along the row direction of the picture element array) and which has its center at the picture element j. Also, for each picture element j among all of the picture elements constituting the image represented by the received image signal, the gradient vector calculating means 21 calculates the direction θ of the image density gradient vector of the image signal with Formula (1) shown below by using the image signal values (i.e., the picture element values) $f_1$ through $f_{16}$ corresponding to the picture elements located at the peripheral areas of the mask.

$$\theta = \tan^{-1} \frac{(f_3 + f_4 + f_5 + f_6 + f_7) - (f_{11} + f_{12} + f_{13} + f_{14} + f_{15})}{(f_1 + f_2 + f_3 + f_{15} + f_{16}) - (f_7 + f_8 + f_9 + f_{10} + f_{11})} \quad (1)$$

The mask size is not limited to five picture elements (located along the column direction of the picture element array)×five picture elements (located along the row direction of the picture element array), and may be selected from various different sizes.

The detection size setting means 22 sets the minimum size (the radius Rmin) and the maximum size (the radius Rmax) of the prospective tumor pattern to be detected. For this purpose, information representing the minimum size and the maximum size may be inputted by the operator from an input means (not shown), such as a keyboard, which is provided in the detection size setting means 22. Alternatively, information representing various sizes may be stored previously in the detection size setting means 22, and one of the sizes may be selected automatically in accordance with the kind of the image to be processed.

The number of the radial direction lines, which is set by the direction line setting means 23, is not limited to 32. However, if the number of the radial direction lines is very large, the amount of the calculation processing will become very large. If the number of the radial direction lines is very small, the contour shape of the prospective tumor pattern cannot be detected accurately. Therefore, the number of the radial direction lines should preferably be approximately 32. From the view point of the calculation processing, or the like, the radial direction lines should preferably be set at equal angle intervals.

In the maximum value calculating means 26, in lieu of the starting point being set at the picture element of interest, the starting point may be set at a picture element located at a length of distance corresponding to the minimum size Rmin of the prospective tumor pattern to be detected, which length of distance is taken from the picture element of interest.

In such cases, in lieu of Formula (5), the mean value Ci(n) of the index values cos θil having been calculated for the picture elements, which are located along each of the radial direction lines and fall within the range from the starting point to the end point, is represented by Formula (5') shown below.

$$Ci(n) = \frac{1}{n - Rmin + 1} \sum_{i=Rmin}^{n} \cos\theta_{il}, \ Rmin \leq n \leq Rmax \quad (5')$$

In the comparison and judgment means 28, the value C of the degree of centralization of the gradient vector group and the predetermined threshold value T are compared with each other. The term "predetermined threshold value" as used herein means the threshold value determined before an ultimate comparison is made. In this embodiment, several threshold values of different levels are prepared. The threshold value of each level is employed by way of trial, and a threshold value of a level is ultimately employed such that the number of detected prospective tumor patterns may fall within the range of seven to ten. The ultimately employed threshold value is also referred to as the predetermined threshold value.

As the dynamic contour extracting technique in the contour extracting means 32, the snakes model described above may be employed.

In the snakes model, the tendency of deformation is determined by defining energy of the dynamic curve and quantitatively rating the state of the dynamic curve. The energy of the dynamic curve is defined such that the level of energy may become minimum when the dynamic curve coincides with the target contour. The target contour can be extracted by finding the stable state, in which the level of energy of the dynamic curve becomes minimum. The level of energy is defined as the total sum of a plurality of levels of energy, which are defined in accordance with the states of the dynamic curve. The levels of energy, which are defined in accordance with the states of the dynamic curve, include a level of energy, which is defined in accordance with the characteristics of the dynamic curve, a level of energy, which is defined in accordance with limitations imposed upon the dynamic curve from the exterior, and the like.

In general, a point on the dynamic curve is represented by the formula shown below $$v(s)=(x(s), y(s))$$

by using a parameter s corresponding to the distance from a predetermined point on the dynamic curve, the distance being taken along the dynamic curve. Also, energy $E_{snakes}$ which the dynamic curve has is represented by the formula shown below.

$$Esnake = \int_0^1 Esnake(v(s))\,ds$$
$$= \int_0^1 \{Eint(v(s)) + Eimage(v(s)) + Eext(v(s))\}\,ds$$

wherein Eint represents the internal energy, Eimage represents the image energy, and Eext represents the external energy.

The internal energy Eint is the value for rating the characteristics of the dynamic curve. The characteristics have heretofore been rated as the "smoothness," and the internal energy is also referred to as the spline energy. The internal energy is defined such that it may take a small value for a smooth dynamic curve. In cases where deformation is carried out such that the internal energy may become small, the dynamic curve becomes smooth. The internal energy is represented by the formula shown below.

$$Eint=\{w_{sp1}\times|v_s(s)|^2+w_{sp2}\times|v_{ss}(s)^2\}/2$$

wherein $v_s(s)=dv(s)/ds$, $v_{ss}(s)=d^2v(s)/ds^2$, and each of $w_{sp1}$ and $w_{sp2}$ represents the parameter representing the weight of each term.

The image energy Eimage is the value for rating the effects of the image upon the dynamic curve. As the effects, the "image density gradient" has heretofore been utilized. Specifically, the characteristics such that the image density gradient at an image portion in the vicinity of the contour is sharper than the image density gradients at the other image portions. The image energy is defined such that it may take a small value for an image portion at which the image density gradient is sharp. As a result, the dynamic curve is brought to the contour as the deformation proceeds. The image energy is represented by the formula shown below.

$$Eimage=w_{grad}\times\{-grad^2I(x, y)\}$$

wherein I(x, y) represents the image density at the point (x(s),y(s)), and $w_{grad}$ represents the parameter representing the weight.

The external energy Eext is the value for rating the limitations imposed intentionally by the operator. In general, as the limitations, a potential field specialized for each image, or the like, is employed. As in the two kinds of energy described above, the external energy is defined such that the dynamic curve may become close to the contour when the dynamic curve is deformed such that the external energy may become small. However, the external energy can be defined arbitrarily as a design item and lacks general-purpose properties. Therefore, In this embodiment, the external energy is ignored (Eext=0).

Specifically, with respect to the marginal points having been set, an initial dynamic curve (initial snakes) is set. The initial dynamic curve has n number of nodes on the circumference of a circle having a radius Rmax and having its center at the position, at which the calculated center of gravity is located. A contraction repeating process is carried out until the dynamic curve converges. When the dynamic curve has converged, the nodes are connected with one another, and the picture elements falling within the region surrounded by the connecting curves are extracted.

How the prospective abnormal pattern detecting apparatus 10 operates will be described hereinbelow.

The entire area image signals SA and SB, which have been inputted from the storage means 20 into the prospective abnormal pattern detecting apparatus 10, is fed into the image position matching means 11. As illustrated in FIG. 6, the image position matching means 11 matches the positions of the two entire area images with each other. After the position matching of the two entire area images has been carried out by the image position matching means 11, only the entire area image signal SA is fed into the prospective abnormal pattern region detecting means 12, which detects the region of the prospective abnormal pattern.

The entire area image signal SA, which has been inputted into the prospective abnormal pattern region detecting means 12, is fed into the gradient vector calculating means 21, the picture-element-of-interest setting means 24, and the contour extracting means 32. As described above, the gradient vector calculating means 21 sets the mask, which has a size of five picture elements (located along the column direction of the picture element array)×five picture elements (located along the row direction of the picture element array). Also, for each picture element among all of the picture elements constituting the image represented by the received image signal, the gradient vector calculating means 21 calculates the direction θ of the image density gradient vector of the image signal by using the image signal values (i.e., the picture element values) corresponding to the picture elements located at the peripheral areas of the mask. Information representing the calculated direction θ of the image density gradient vector is fed into the index value calculating means 25.

The picture-element-of-interest setting means 24 sets an arbitrary picture element, which is among all of the picture elements in the radiation image represented by the received entire area image signal SA, as the picture element of interest. The picture elements are successively set as the picture element of interest. Information representing the thus set picture element of interest is fed into the direction line setting means 23. The direction line setting means 23 sets the 32 radial direction lines on the radiation image, the radial direction lines extending radially from the set picture element of interest and being adjacent to one another at equal angle intervals of, e.g., 11.25 degrees. Information representing the set radial direction lines is fed into the index value calculating means 25.

Information representing the minimum size (the radius Rmin) and the maximum size (the radius Rmax) of the prospective tumor pattern to be detected by the prospective abnormal pattern region detecting means 12 is inputted by the operator into the detection size setting means 22. The information representing the minimum size Rmin and the maximum size Rmax is also fed into the index value calculating means 25.

The index value calculating means 25 superposes the 32 radial direction lines, which have been set by the direction line setting means 23, upon the picture elements, which are arrayed in the two-dimensional array as in the image signal and for which the directions θ of the gradient vectors have been calculated by the gradient vector calculating means 21. Also, the index value calculating means 25 extracts the picture elements located on each of the 32 radial direction lines.

Further, the index value calculating means 25 calculates the index value cos θil for each picture element among the picture elements, which are located along each of the radial direction lines and fall within the range from the picture element of interest to a picture element that is located at the length of distance corresponding to the maximum size Rmax of the prospective tumor pattern to be detected. The index value cos θil is calculated from the angle θil that is made between the direction θ of the gradient vector, which has been calculated for each picture element, and the direction along which the radial direction line extends. (The angle θil represents the angle that is made between the gradient vector, which has been calculated for an l'th picture element, as counted from the picture element of interest, on an i'th radial direction line among the 32 radial direction lines, and the direction along which the i'th radial direction line extends.)

Information representing the index values cos θil having been calculated for the picture elements, which are located along each of the radial direction lines, is fed into the maximum value calculating means 26. The maximum value calculating means 26 calculates the mean value Ci(n) of the index values cos θil having been calculated for the picture elements, which are located along each of the radial direction lines and fall within the range from a starting point to an end point, the starting point being set at the picture element of interest, the end point being set at one of the picture elements that are located between a position at the length of distance corresponding to the minimum size Rmin of the prospective tumor pattern to be detected and the position at the length of distance corresponding to the maximum size Rmax of the prospective tumor pattern to be detected. A plurality of the mean values Ci(n) are obtained for each of the radial direction lines by successively setting the end point at the picture elements. Also, the maximum value calculating means 26 extracts the maximum value Cimax of the mean values Ci(n) of the index values cos θil, which mean values have been obtained for each of the radial direction lines by successively setting the end point at the picture elements.

The mean value Ci(n) takes the maximum value Cimax in cases where the picture element at the end point is located at the margin of the tumor pattern $P_1$, i.e. in cases where the picture element at the end point corresponds to a rising point G in the distribution of the output value $I_1$ (=C) of the iris filter processing illustrated in FIG. 11A.

Information representing the maximum value Cimax, which has been extracted for each of the radial direction lines, is fed into the centralization degree calculating means 27. The centralization degree calculating means 27 calculates the arithmetic mean value of the maximum values Cimax, which have been obtained for all of the 32 radial direction lines, and thereby calculates the value C of the degree of centralization of the gradient vector group with respect to the picture element of interest. Information representing the value C of the degree of centralization of the gradient vector group with respect to the picture element of interest is fed into the comparison and judgment means 28.

The same operations as those described above are carried out by successively setting the picture element of interest at different picture elements in the picture-element-of-interest setting means 24. Information representing the values C of the degrees of centralization, which have been calculated with respect to all of the picture elements in the radiation image, is fed into the comparison and judgment means 28.

The comparison and judgment means 28 compares the value C of the degree of centralization of the gradient vector group and an initially set threshold value T with each other. In cases where C≧T, the comparison and judgment means 28 judges that the picture element of interest is located within the region of the prospective tumor pattern. In cases where C<T, the comparison and judgment means 28 judges that the picture element of interest is not located within the region of the prospective tumor pattern.

The initially set threshold value T is not necessarily an appropriate value. Specifically, if the threshold value T is very small, even a picture element, which is not located within the region of the tumor pattern $P_1$ and is located within the region of the mammary gland pattern $P_2$ (corresponding to the output value $I_2$ of the iris filter processing), will be judged as being located within the region of the tumor pattern $P_1$.

Therefore, the comparison and judgment means 28 adjusts the level of the threshold value such that the number of the regions, which are constituted of the picture elements having been judged as being located within the region of the prospective tumor pattern, may fall within the range of seven to ten. Information representing the region constituted of the picture elements, which have been judged as being located within the region of the prospective tumor pattern as a result of the processing with the adjusted threshold value T, is fed into the center-of-gravity calculating means 29.

As illustrated in FIG. 11B, in cases where the threshold value, which has been set such that the number of the detected regions falls within the range of seven to ten, is equal to T2, the two peak portions of the distribution pattern of the value C (=I) of the degree of centralization in the tumor pattern $P_1$ are cut out by the level of the threshold value T2. As a result, the proper region of the tumor pattern $P_1$, which is indicated by the broken line in FIG. 11B, is extracted as two regions A1 and A2.

The center-of-gravity calculating means 29 calculates the center of gravity on each of the seven to ten regions, which have been detected in the manner described above. For example, as for the region A1, the center of gravity a1 is calculated. As for the region A2, the center of gravity a2 is calculated. Also, as for each of the other seven to eight regions of prospective tumor patterns (prospective abnormal patterns), the center of gravity is calculated.

Information representing the center of gravity is fed into the marginal point setting means 31. From the maximum value calculating means 26, the marginal point setting means 31 receives the information representing a picture element corresponding to the end point that is associated with the maximum value Cimax of the mean values Ci(n) for each of the radial direction lines, the maximum value Cimax having been extracted by the maximum value calculating means 26, when a picture element corresponding to the position, at which the center of gravity is located, is taken as the picture element of interest. The picture element corresponding to the end point is thus specified with respect to each of the radial direction lines.

As described above, the picture element corresponding to the end point, which is associated with the maximum value Cimax of the mean values Ci(n) for each of the radial direction lines, represents the margin of the prospective tumor pattern. Therefore, as illustrated in FIG. 11C, when the picture element corresponding to the position, at which the center of gravity a1 on the region A1 is located, is taken as the picture element of interest, the picture elements b1, b2, . . . , b32 corresponding to the end points, which are associated with the maximum values Cimax of the mean values Ci(n) for the radial direction lines, are located on the proper margin of the tumor pattern $P_1$. Also, when the picture element corresponding to the position, at which the center of gravity a2 on the region A2 is located, is taken as the picture element of interest, the picture elements c1, c2, . . . , c32 corresponding to the end points, which are associated with the maximum values Cimax of the mean values Ci(n) for the radial direction lines, are located on the proper margin of the tumor pattern $P_1$.

Figure 12A:
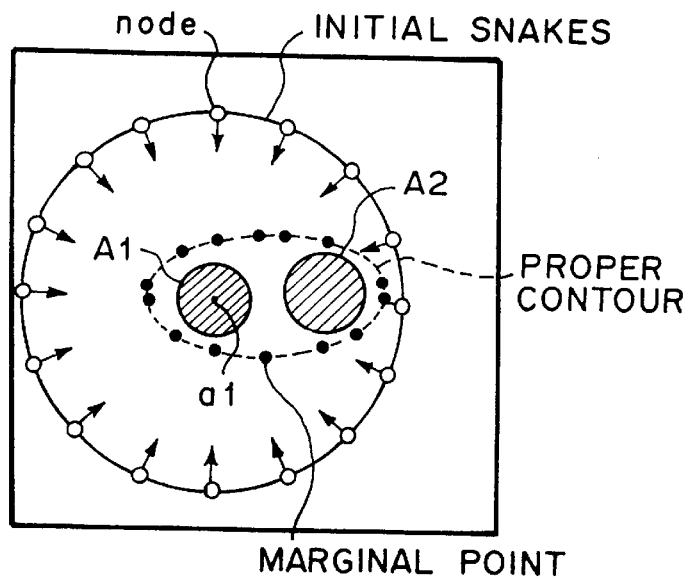
FIGS. 12A, 12B, and 12C are explanatory views showing how a snakes model operates.
Figure 12B:
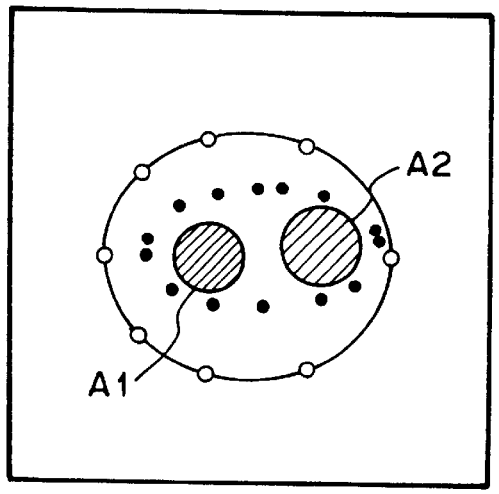
Figure 12C:
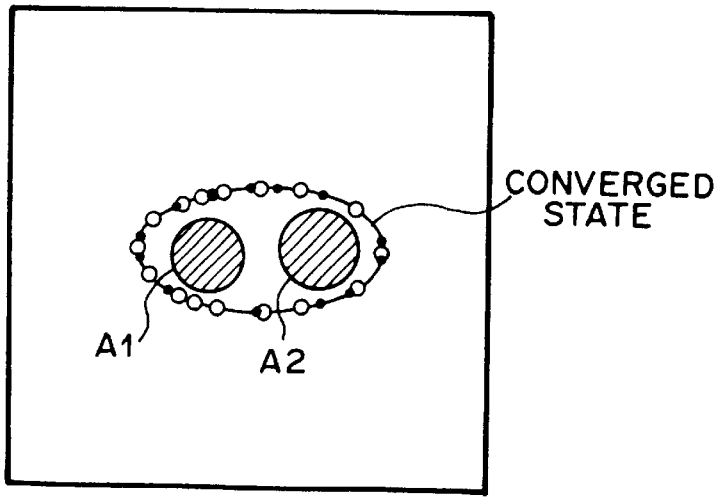

As illustrated in FIG. 12A, with respect to the picture elements (the marginal points) located on the margin of each prospective tumor pattern, the contour extracting means 32 sets the initial dynamic curve (initial snakes). The initial dynamic curve has n number of nodes on the circumference of the circle having the radius Rmax and having its center at the position, at which the calculated center of gravity is located. Also, as illustrated in FIG. 12B, the contraction repeating process is carried out until the dynamic curve converges. As illustrated in FIG. 12C, when the dynamic curve has converged, the nodes are connected with one another, and the region surrounded by the connecting curves is extracted as the region of the prospective tumor pattern.

In the embodiment described above, the maximum value calculating means 26 sets the starting point at the picture element of interest. In lieu of the starting point being set at the picture element of interest, the starting point may be set at the picture element located at the length of distance corresponding to the minimum size Rmin of the prospective tumor pattern to be detected, which length of distance is taken from the picture element of interest.

Thereafter, the region setting means 13 sets the region in the CC(L) image (i.e., the image represented by the entire area image signal SB), which region corresponds to the region of the prospective abnormal pattern, which has been detected by the prospective abnormal pattern region detecting means 12, in the CC(R) image (i.e., the image represented by the entire area image signal SA). Since the positions of the CC(R) image and the CC(L) image have been matched with each other as illustrated in FIG. 6, if a picture element located in the region of the prospective abnormal pattern in the CC(R) image has coordinates (x1, y1), the coordinate values of a picture element in the CC(L) image, which picture element corresponds to the aforesaid picture element in the CC(R) image, may be represented by (−x1, y1). Therefore, the coordinates of the region having been detected in the CC(R) image can be set easily in the CC(L) image by taking the boundary line between the two images as the axis of symmetry.

The entire area image signals SA and SB, which have been fed into the prospective abnormal pattern detecting apparatus 10, are also fed into the iris filter processing means 14.

The iris filter processing means 14 carries out the iris filter processing on the image signal components of each of the received entire area image signals SA and SB, which image signal components represent the picture elements located in the region having been set by the region setting means 13. Specifically, each of the picture elements located in the set region is taken as the picture element of interest, and the maximum values Cimax of the degrees of centralization of the image density gradient vectors are calculated with Formula (6) shown above with respect to the picture element of interest. Thereafter, with Formula (7) shown above, the mean value of the maximum values Cimax of the degrees of centralization, which maximum values Cimax have been given by Formula (6) for the plurality of radial direction lines that extend radially from the picture element of interest, is calculated. The mean values, which have thus been calculated for the entire area image signals SA and SB, are taken as the output values IA and IB of the iris filter processing means 14.

The information representing the output values IA and IB, which have been obtained from the iris filter processing means 14, is fed into the difference value calculating means 15. The iris filter processing means 14 calculates the difference value AI between the output values IA and IB, which have been obtained with respect to corresponding picture elements in the two regions having been set by the region setting means 13. The calculation is made with Formula (9) shown below.

$$\Delta I = IA - IB \tag{9}$$

In cases where the value of $\Delta I$ is not larger than 0, it is indicated that the regions, which are associated with the output values IA and IB taking approximately equal values, are located at the corresponding positions in the right and left mamma images. There is little probability of tumors occurring simultaneously at corresponding positions in the right and left mammae. Therefore, incases where the value of $\Delta I$ is not larger than 0, there is a strong possibility that the prospective abnormal pattern located in the region will be a false positive. Therefore, incases where the value of $\Delta I$ is not larger than 0, the region is regarded as being a false positive and canceled. In cases where the value of $\Delta I$ is larger than 0, the values of $\Delta I$ obtained in the region are normalized with Formula (10) or (10') shown below, and a difference value $\Delta I'$ is thereby obtained. The information representing the difference value $\Delta I'$ is fed into the comparison means 18.

$$\Delta I' = \Sigma |\Delta I|/(\text{area of region}) \tag{10}$$

$$\Delta I' = \Sigma \Delta I^2/(\text{area of region}) \tag{10'}$$

The rating function value calculating means 16 detects the degree of malignancy of the prospective abnormal pattern, which has been detected by the prospective abnormal pattern region detecting means 12, in accordance with the entire area image signal SA.

Figure 13:
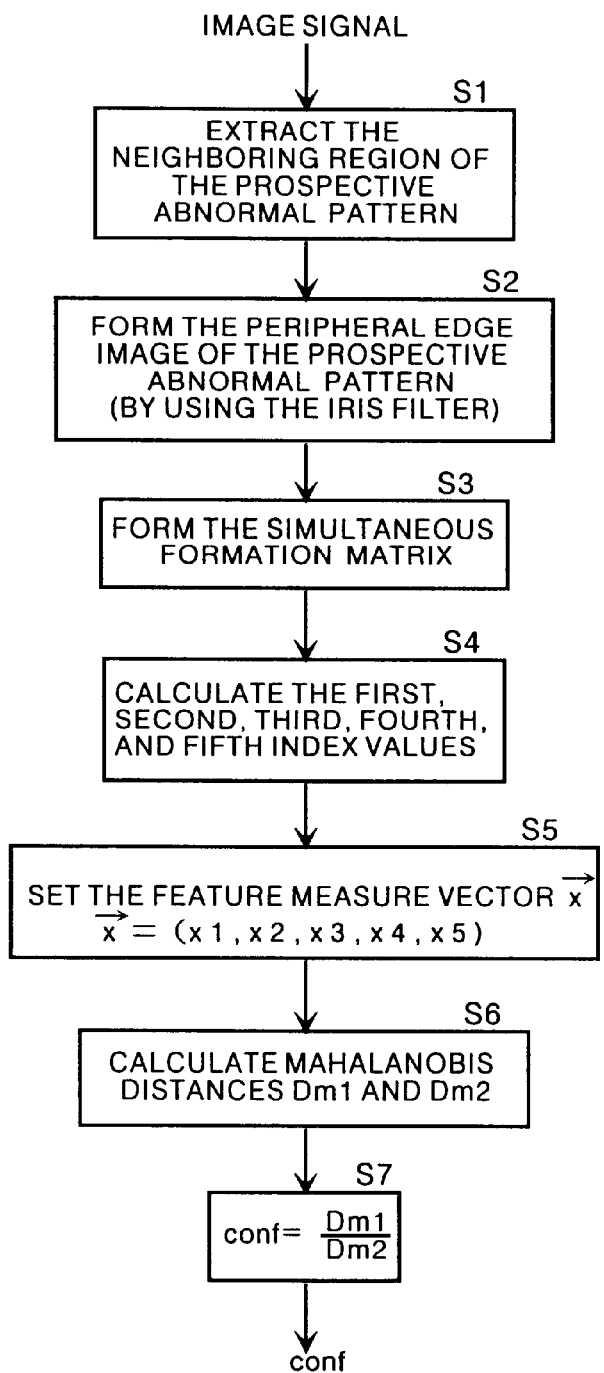
FIG. 13 is a flow chart showing how a degree of malignancy is detected in a rating function value calculating means.

FIG. 13 is a flow chart showing how the degree of malignancy is detected in the rating function value calculating means 16. Firstly, in a step S1, for the region of the prospective abnormal pattern having been detected by the prospective abnormal pattern region detecting means 12, the image portion containing the detected region and the neighboring region is found as, for example, a square region. Thereafter, in a step S2, as for the thus found region containing the prospective abnormal pattern, a peripheral (contour) edge image is formed by utilizing the iris filter processing. How the peripheral edge image is formed will be described hereinbelow.

Specifically, with the iris filter processing, the position of the point, which gives the maximum value of the degree of centralization Ci(n) on the i'th radial line extending radially from the picture element of interest, the maximum value being calculated with Formula (6), is detected. In Formula (5) or (5') and Formula (6), the value of n giving the maximum value of the degree of centralization Ci(n) falls within the range of Rmin to Rmax. However, in the processing of the step S2, the value of n is not limited to the aforesaid range.

Figure 14:
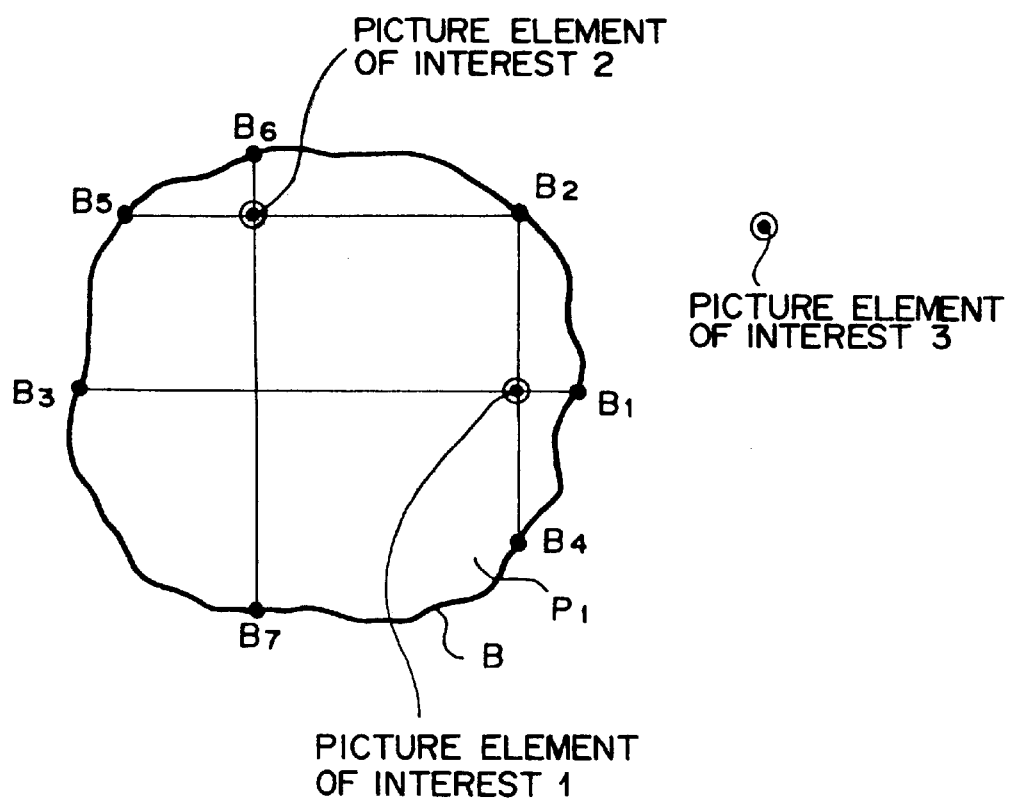
FIG. 14 is an explanatory view showing how an iris filter edge (IFED) image is formed.

As illustrated in FIG. 14, in cases where the picture element of interest is located in the region inward from the prospective abnormal pattern $P_1$, the value of n giving the maximum value of Formula (6) indicates the picture element, at which the i'th radial line intersects with the periphery B of the prospective abnormal pattern $P_1$. For example, as for a picture element of interest 1 shown in FIG. 14, the value of n indicates picture elements $B_1$, $B_2$, $B_3$, and $B_4$. As for a picture element of interest 2 shown in FIG. 14, the value of n indicates picture elements $B_2$, $B_5$, $B_6$, and $B_7$.

Figure 15:
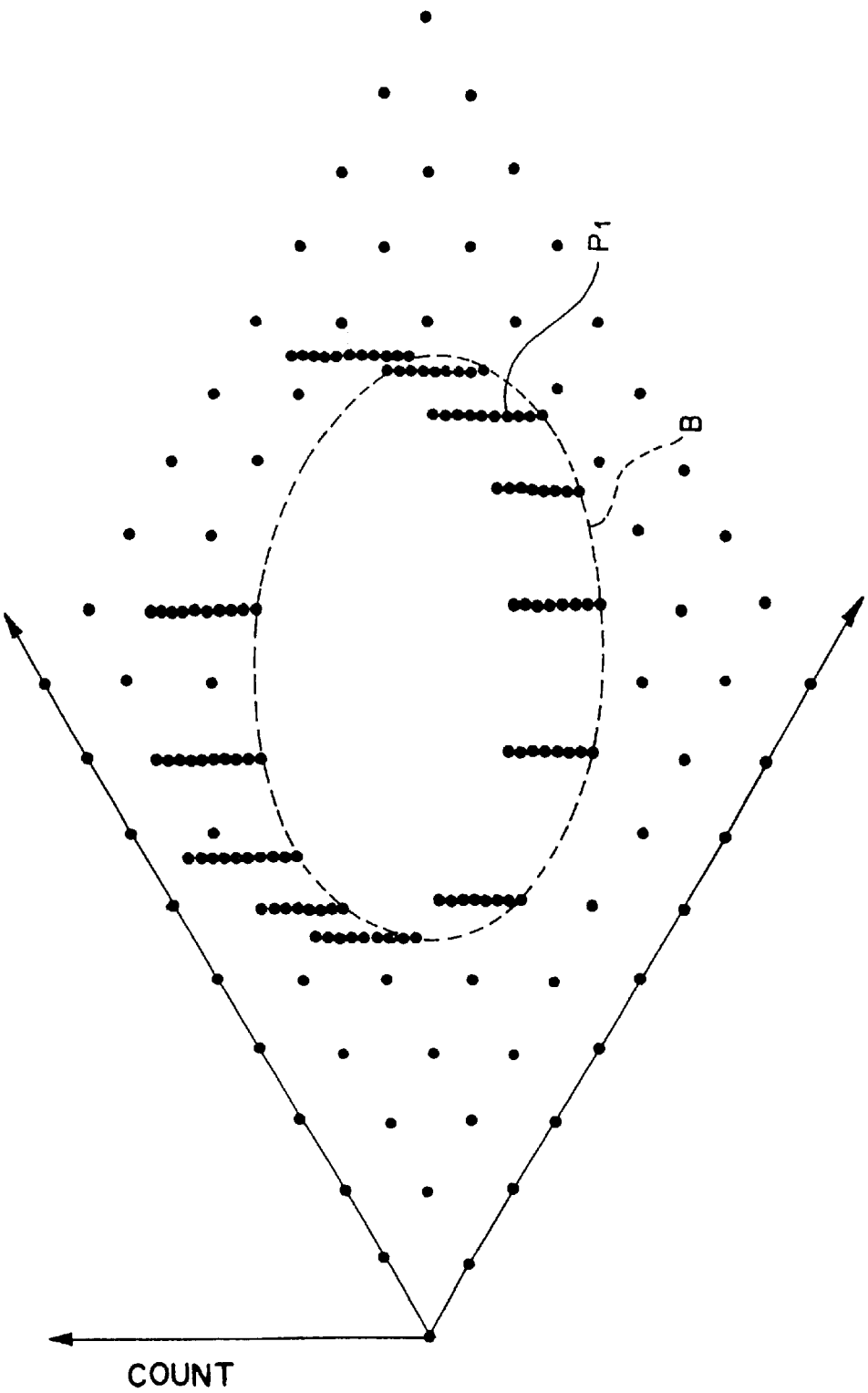
FIG. 15 is an explanatory view showing an IFED image.

In cases where the picture element of interest is located in the region outward from the prospective abnormal pattern $P_1$, when the value of n indicates the picture element of interest itself, the value of Formula (6) takes the maximum value. Specifically, as for a picture element of interest 3, which is located in the region outward from the prospective abnormal pattern $P_1$, the value of Formula (6) takes the maximum value when the value of n indicates the picture element of interest itself. All of the picture elements falling within the extracted region, which contains the prospective abnormal pattern, are successively taken as the picture element of interest, and the number of the picture elements, which are associated with the maximum value of Formula (6), is counted. As a result, an image shown in FIG. 15 is obtained.

Specifically, as for all of the picture elements, which are located in the region outward from the prospective abnormal pattern $P_1$, a count value of "1" is obtained. As for all of the picture elements, which are located in the region inward from the prospective abnormal pattern $P_1$, a count value of "0" is obtained. Also, as for all of the picture elements, which are located on the periphery B of the prospective abnormal pattern $P_1$, count values larger than 1 are obtained. The image representing the count values is defined as an iris filter image (IFED image). In this manner, in the step S2, the IFED image is formed.

In a step S3, the processing described below is carried out on the IFED image.

Figure 16:
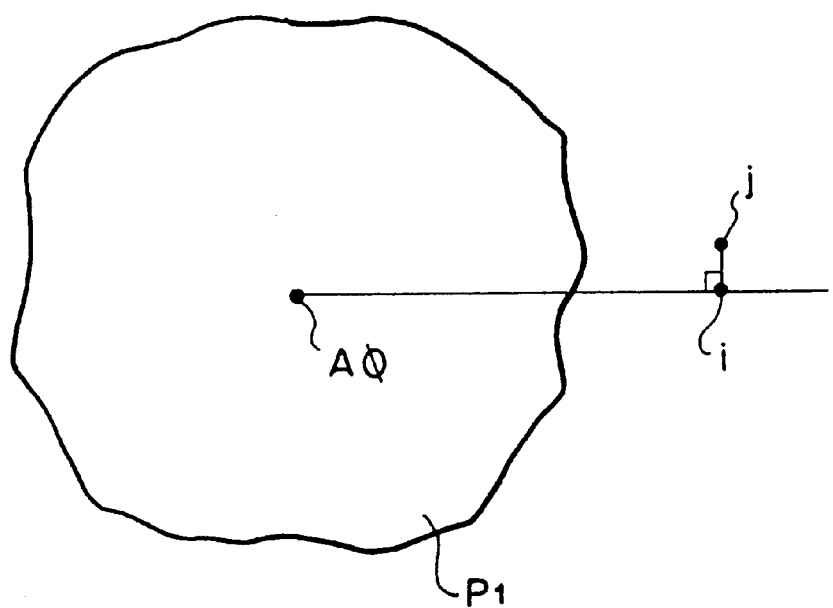
FIG. 16 is an explanatory view showing how a simultaneous formation matrix is formed in accordance with the IFED image.

Specifically, as illustrated in FIG. 16, the position, at which the center of gravity AO on the prospective abnormal pattern $P_1$ is located, is found. A radial line is extended from the position, at which the center of gravity AO is located. An arbitrary point lying on the radial line is represented by i, and a point, which is spaced a distance equal to the sum of the lengths of two picture elements from the point i along a line normal to the radial line, is represented by j. The count value at the point i on the IFED image and the count value at the point j on the IFED image are counted up on a matrix shown in FIG. 17. Specifically, in cases where the point i is located in the region outward from the prospective abnormal pattern $P_1$, the count value at the point i on the IFED image is "1." At this time, in cases where the point j is also located in the region outward from the prospective abnormal pattern $P_1$, the count value at the point j on the IFED image is "1." In such cases, on the matrix shown in FIG. 17, "1" is counted in the cell, which is located at the intersection of an i-row "1" and a j-column "1."

Figure 17:
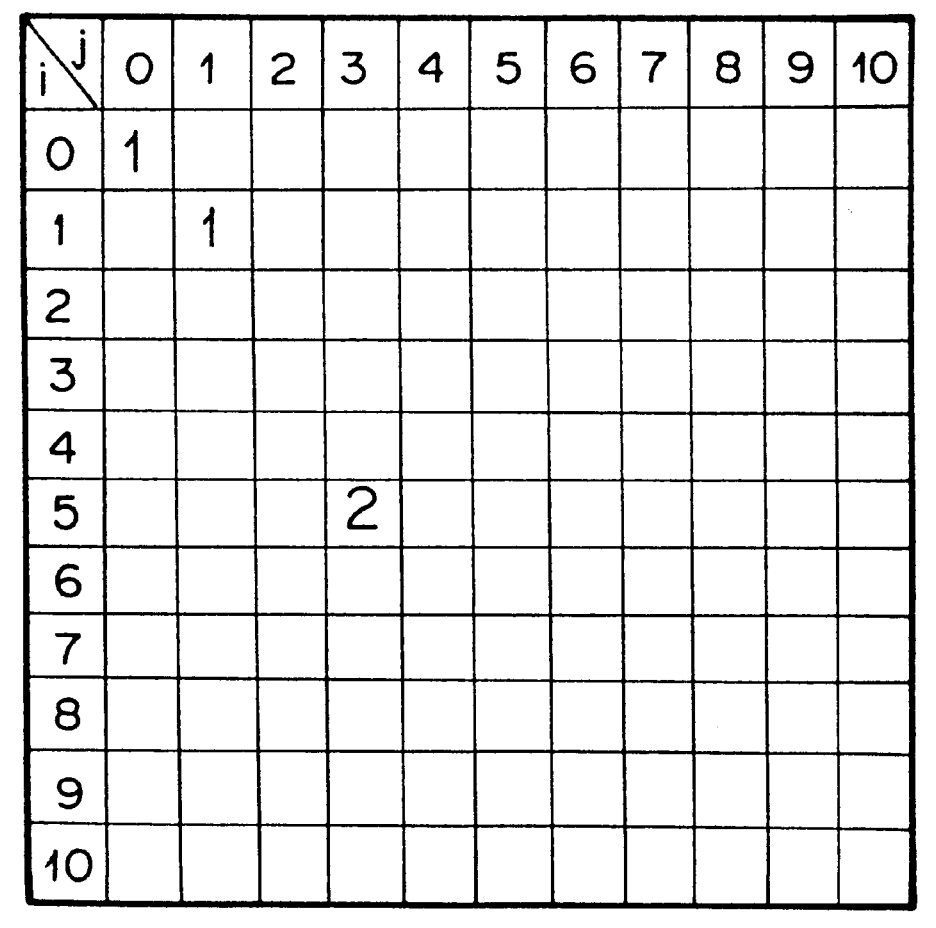

In cases where the point i is located in the region inward from the prospective abnormal pattern $P_1$, and the point j is also located in the region inward from the prospective abnormal pattern $P_1$, the count values at the points i and j on the IFED image are "0." In such cases, on the matrix shown in FIG. 17, "1" is counted in the cell, which is located at the intersection of an i-row "0" and a j-column "0."

Also, in cases where the point i is located at the periphery B of the prospective abnormal pattern $P_1$, and the point j is also located at the periphery B of the prospective abnormal pattern $P_1$, the count value at the point i on the IFED image is, for example, "5," and the count value at the point j on the IFED image is, for example, "3." In such cases, on the matrix shown in FIG. 17, "1" is counted in the cell, which is located at the intersection of an i-row "5" and a j-column "3." The count value, which is counted up on the matrix, is cumulated. Specifically, when the point i on the IFED image, at which the count value is "5," and the corresponding point j on the IFED image, at which the count value is "3," are found again, "1" is added to the previously counted value "1" in the cell, which is located at the intersection of the i-row "5" and the j-column "3," and therefore "2" is stored in the cell.

The point i is an arbitrary point on the IFED image. The radial lines are set such that all of the picture elements of the IFED image may be taken as the point i, and the point i is searched along the respective radial lines. In this manner, the matrix shown in FIG. 17 is completed. The matrix is referred to as the simultaneous formation matrix (or the simultaneous incidence matrix). In this manner, in the step S3, the simultaneous formation matrix Pg(x, y) is completed.

Figure 18A:
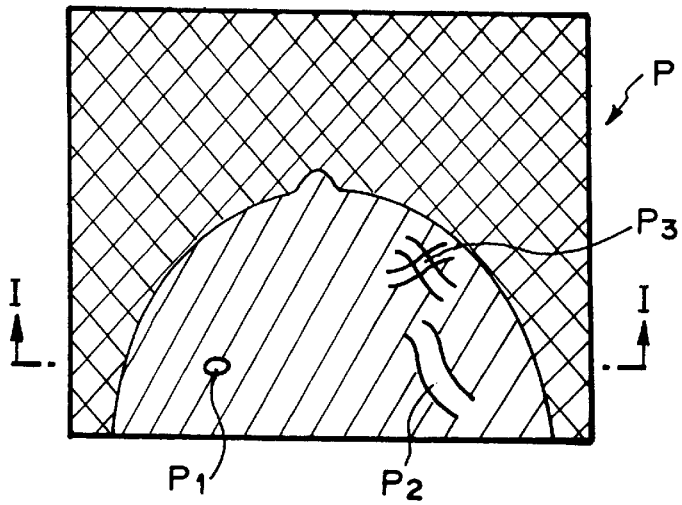
FIG. 18A is an explanatory view showing a radiation image of the mamma (i.e., a mammogram)
Figure 18B:
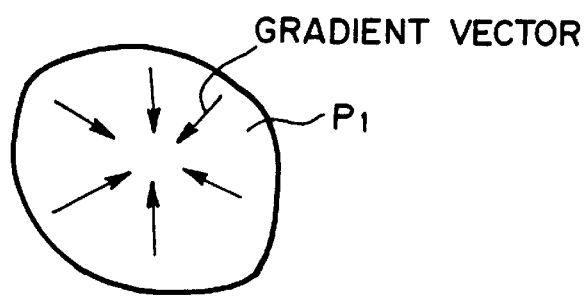
FIG. 18B is an explanatory view showing the degree of centralization of gradient vectors in a tumor pattern.
Figure 18C:
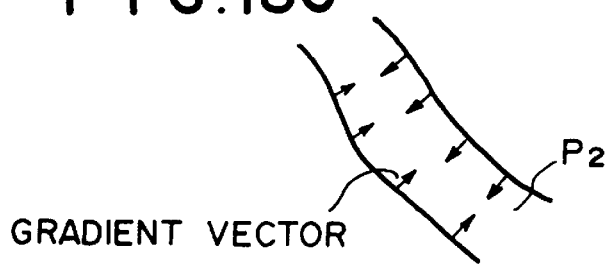
FIG. 18C is an explanatory view showing the degree of centralization of gradient vectors in an elongated pattern, such as a blood vessel pattern or a mammary gland pattern.

A tumor pattern $P_1$ has the characteristics of the shape of the tumor pattern such that the periphery of the tumor pattern $P_1$ has an approximately circular shape. Also, the points i and j are very close to each other. Therefore, in cases where the prospective abnormal pattern is the tumor pattern $P_1$ shown in FIG. 18B, there is a high level of probability that, when the point i is located at the periphery of the tumor pattern $P_1$ (i.e., when the count value at the point i on the IFED image is larger than 1), the point j will also be located at the periphery of the tumor pattern $P_1$ (i.e., the count value at the point j on the IFED image will be larger than 1).

Figure 18D:
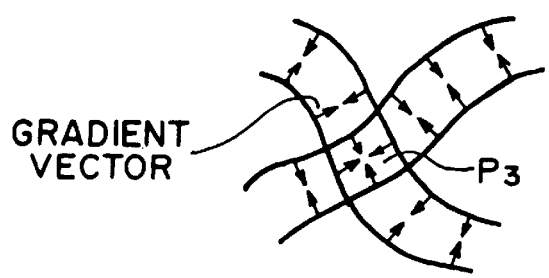
FIG. 18D is an explanatory view showing the degree of centralization of gradient vectors in a portion at which two elongated patterns, such as mammary gland patterns, intersect each other.

On the other hand, in cases where the prospective abnormal pattern is a false positive $P_3$ shown in FIG. 18D, as in the pattern at which two blood vessel patterns intersect each other, it is very rare that the false positive $P_3$ will have a circular periphery. Therefore, even if the points i and j are close to each other, when the point i is located at the periphery of the false positive $P_3$, the point j will not necessarily be located at the periphery of the false positive $P_3$. In such cases, the probability that the point j will also be located at the periphery of the false positive $P_3$ is markedly low.

Therefore, significant differences are found between the tumor pattern $P_1$ and the false positive $P_3$ in the characteristic values of the simultaneous formation matrix Pg(x, y). The characteristic values of the simultaneous formation matrix are herein referred to as the edge information. In a step S4, as the edge information, the following are calculated respectively: (i) a first index value, var, which represents the variance with respect to the simultaneous formation matrix and is calculated with Formula (11), (ii) a second index value, dfe, which represents the difference entropy with respect to the simultaneous formation matrix and is calculated with Formula (12), (iii) a third index value, cor, which represents the correlation with respect to the simultaneous formation matrix and is calculated with Formula (13), (iv) a fourth index value, idm, which represents the inverse difference moment with respect to the simultaneous formation matrix and is calculated with Formula (14), and (v) a fifth index value, se, which represents the sum entropy with respect to the simultaneous formation matrix and is calculated with Formula (15).

$$var = \sum_i \sum_j \{(i - \mu_x)^2 \cdot P_g(i, j)\} \quad (11)$$

$$dfe = \sum_k \{P_{x-y}(k) \cdot \log|P_{x-y}(k)|\} \quad (12)$$

$$cor = \sum_i \sum_j [\{i \cdot j \cdot P_g(i, j) - \mu_x \cdot \mu_y\}/(\sigma_x \cdot \sigma_y)] \quad (13)$$

$$idm = \sum_i \sum_j [P_g(i, j)/\{1 + (i - j)^2\}] \quad (14)$$

$$se = -\sum_k [P_{x+y}(k) \cdot \log\{P_{x+y}(k)\}] \quad (15)$$

wherein $$\mu_x = \sum_i \{i \cdot P_x(i)\}, \mu_y = \sum_j \{j \cdot P_y(j)\}$$

$$P_{x-y}(k) = \sum_i \sum_j P_g(i, j), k = |i - j|$$

$$P_{x+y}(k) = \sum_i \sum_j P_g(i, j), k = i + j$$

$$\sigma_x^2 = \sum_i (i - \mu_x)^2 \cdot P_x(i)$$

$$\sigma_y^2 = \sum_j (j - \mu_y)^2 \cdot P_y(j)$$

Px(i) represents the projection distribution along the j direction, i.e., $$P_x(i) = \sum_j P_g(i, j)$$

and Py(j) represents the projection distribution along the i direction, i.e., $$P_y(j) = \sum_i P_g(i, j)$$

Each of the first index value, var, the second index value, dfe, the third index value, cor, and the fifth index value, se, with respect to the simultaneous formation matrix takes a comparatively large value for the tumor pattern $P_1$ and takes a small value for the false positive $P_3$, such as a mammary gland pattern or a blood vessel pattern. The fourth index value, idm, with respect to the simultaneous formation matrix takes a comparatively small value for the tumor pattern $P_1$ and takes a large value for the false positive $P_3$, such as a mammary gland pattern or a blood vessel pattern.

Also, a new rating function value is obtained by defining these index values with a predetermined weight function. An example, in which a new rating function value is calculated by defining an arbitrary number of the feature measures with a predetermined weight function, will be described hereinbelow.

As described above, as the rating function value defined with the weight function, the Mahalanobis distance or the Fisher discriminating function should preferably be employed.

In a step S5, the five index values are allocated to five-dimensional different axes (x1, x2, x3, x4, and x5). For example, the index values var, dfe, cor, idm, and se are allocated respectively to the axes x1, x2, x3, x4, and x5. The vector $$\vec{x}$$

composed of the five-order elements is set.

Thereafter, in a step S6, the Mahalanobis distance Dm1 with respect to a pattern class, which represents the normal pattern, and the Mahalanobis distance Dm2 with respect to a pattern class, which represents the abnormal pattern, are calculated with Formula (8).

$$Dmi = (\vec{x} - \vec{mi})^t \sum_i^{-1} (\vec{x} - \vec{mi}) \quad (8)$$

wherein $\Sigma i$ represents the covariance matrix of the pattern class (pattern classification between the normal pattern of i=1 and the abnormal pattern of i=2) wi, i.e., $$\Sigma_i = (1/Ni) \sum_{x \in wi} (\vec{x} - \vec{mi})(\vec{x} - \vec{mi})^t$$

t represents the transposed vector (row vector), $\vec{x}$ represents the vector of the feature measure x, i.e., $$\vec{x} = (x1, x2, \cdots, xN)$$

$\Sigma i^{-1}$ represents the inverse matrix of $\Sigma i$, and $\vec{mi}$ represents the mean value of the pattern classes wi, i.e., $$\vec{mi} = (1/Ni) \sum_{x \in wi} \vec{x}$$

Each of the pattern class of the normal pattern and the pattern class of the abnormal pattern represents the class of the pattern space, which is set in accordance with the results of experiments carried out on a plurality of prospective abnormal patterns and is defined by the vector $$\vec{x}$$

with respect to each of the normal pattern and the abnormal pattern. For example, the pattern class w1 is formed with the mean value of the vector $$\vec{x}$$

with respect to the normal pattern, and the pattern class w2 is formed with the mean value of the vector $$\vec{x}$$

with respect to the abnormal pattern.

In this manner, a calculation is made to find the Mahalanobis distance Dm1 between the pattern class, which represents the normal pattern and has been set previously, and the pattern class (the aforesaid vector $$\vec{x}),$$

which represents the prospective abnormal pattern to be detected. Also, a calculation is made to find the Mahalanobis distance Dm2 between the pattern class, which represents the abnormal pattern and has been set previously, and the pattern class (the aforesaid vector $$\vec{x}),$$

which represents the prospective abnormal pattern to be detected. Thereafter, in a step S7, a calculation is made to find a ratio, conf (=Dm1/Dm2), of the Mahalanobis distance Dm1 with respect to the pattern class, which represents the normal pattern, to the Mahalanobis distance Dm2 with respect to the pattern class, which represents the abnormal pattern. The calculated ratio, conf, is taken as the rating function value which represents the degree of malignancy, and the information representing the calculated ratio is fed into the comparison means 18.

In the comparison means 18, the difference value ΔI' is weighted with the aforesaid ratio, conf, and a judgment is made as to whether the weighted difference value ΔI'×conf is or is not larger than the threshold value T0, which is stored in the memory 17. In cases where the weighted difference value ΔI'×conf is larger than the threshold value T0, it is judged that the prospective abnormal pattern is the definite prospective abnormal pattern, which represents the tumor pattern. In cases where the weighted difference value ΔI'× conf is not larger than the threshold value T0, it is judged that the prospective abnormal pattern is not the tumor pattern and is a false positive.

The image signal representing the prospective abnormal pattern, which has been extracted accurately by the prospective abnormal pattern detecting apparatus 10, is fed into the local area limited image processing means 40. In the local area limited image processing means 40, the received image signal is subjected to emphasis processing for emphasizing the prospective tumor pattern. The image signal having been obtained from the emphasis processing is fed into the displaying means 50.

Also, in the entire area image processing means 30, image processing, such as gradation processing or frequency processing, for obtaining an entire area image having good image quality is carried out on the entire area image signal. The entire area image signal having been obtained from the image processing is fed from the entire area image processing means 30 into the displaying means 50. On the displaying means 50, the entire area image, which is represented by the entire area image signal, is displayed, such that the image portion corresponding to the prospective tumor pattern in the entire area image may be replaced by the prospective tumor pattern, which has been obtained from the image processing carried out by the local area limited image processing means 40. The displayed visible image is used by a person, who views the radiation image, such as a medical doctor, in making a diagnosis of the tumor pattern.

As described above, there is little probability of tumors occurring simultaneously at corresponding positions in the right and left mammae. Therefore, there is little probability that, in cases where a prospective abnormal pattern is detected in the radiation image of one of the right and left mammae of an object, a prospective abnormal pattern will occur also at the corresponding position in the radiation image of the other mamma of the object. This embodiment is based upon such assumption. With this embodiment, in cases where prospective abnormal patterns are detected at corresponding positions in the radiation images of the right and left mammae, the prospective abnormal patterns are regarded as false positives. Therefore, the level of probability that an ultimately detected prospective abnormal pattern will be the true abnormal pattern becomes very high. Accordingly, the abnormal pattern can be detected accurately.

In experiments carried out by the inventor, with respect to data base images containing 221 images, the detection method in accordance with the present invention and the conventional detection method were carried out. The results shown in Table 1 below were obtained.

TABLE 1

|    | Conventional method | Method of present invention |
|----|---------------------|-----------------------------|
| TP | 94%                 | 94%                         |
| FP | 1.3 pieces/image    | 0.53 piece/image            |

As clear from Table 1, with the method in accordance with the present invention, the correct judgment rate of the normal image patterns (TP) was 94% as with the conventional method. Thus comparatively good results were obtained. However, with the conventional method, the erroneous judgment rate (FP) was as high as 1.3 pieces per image. On the other hand, with the method in accordance with the present invention, the erroneous judgment rate (FP) was as low as 0.53 piece per image. Thus the erroneous judgment rate with the method in accordance with the present invention was approximately ⅓ of that with the conventional method. Therefore, with the method in accordance with the present invention, better results with a lower erroneous judgment rate can be obtained than with the conventional method.

In the embodiment described above, in the comparison means 18, the difference value ΔI' is weighted with the ratio, conf, which has been calculated by the rating function value calculating means 16. Alternatively, the difference value ΔI may be compared with a predetermined threshold value, and a judgment as to whether the prospective abnormal pattern is or is not the true abnormal pattern may be made in accordance with the results of the comparison. Specifically, information representing a threshold value T0', which is different from the aforesaid threshold value T0, may be stored in the memory 17, and the difference value ΔI may be compared with the threshold value T0'. In cases where the difference value ΔI is larger than the threshold value T0', the prospective abnormal pattern may be judged as being a true abnormal pattern. In cases where the difference value ΔI is not larger than the threshold value T0', the prospective abnormal pattern may be judged as being a false positive.

What is claimed is:

1. A method of detecting a definite prospective abnormal pattern, in which an image signal representing a radiation image of a right mamma of an object and an image signal representing a radiation image of a left mamma of the object are obtained, each of the image signals being made up of a series of image signal components representing picture elements in the radiation image, and wherein a prospective abnormal pattern is detected from one of the radiation images of either one of the right and left mammae in accordance with the image signals, the method comprising the steps of:

(a) detecting the prospective abnormal pattern in one of the image signals representing the radiation images of the right and left mammae, (b) setting a region of the detected prospective abnormal pattern in one radiation image, which is represented by the one image signal, and setting a region in the radiation image of the opposite mamma, which region corresponds to the position of said region of the detected prospective abnormal pattern in the one radiation image, (c) carrying out iris filter processing on image signal components, which represent picture elements located in both regions set in step (b), respective iris filter output signals being thereby obtained, (d) calculating a difference value between said respective iris filter output signals, which have been obtained with respect to corresponding picture elements in said both regions, and (e) determining the definite prospective abnormal pattern from said difference value calculated in step (d).

2. A method as defined in claim 1 wherein the detection of the prospective abnormal pattern is carried out with a process comprising the steps of:

(1) for each picture element among all of the picture elements in the one radiation image of the mamma, which is represented by the one image signal, calculating a gradient vector of the image signal, (2) setting an arbitrary picture element, which is among all of the picture elements in the radiation image, as a picture element of interest, (3) setting a plurality of radial direction lines on the radiation image, said radial direction lines extending radially from said picture element of interest and being adjacent to one another at predetermined angle intervals, (4) calculating an index value cos θil for each picture element among the picture elements, which are located along each of said radial direction lines and fall within the range from said picture element of interest to a picture element that is located at a length of distance corresponding to the maximum size of the prospective abnormal pattern to be detected, said index value cos θil being calculated from an angle θil that is made between said gradient vector, which has been calculated for said each picture element, and the direction along which said each radial direction line extends, (5) calculating a mean value of the index values cos θil having been calculated for the picture elements, which are located along each of said radial direction lines and fall within the range from a starting point to an end point, said starting point being set at said picture element of interest, said end point being set at one of the picture elements that are located between a position at a length of distance corresponding to the minimum size of the prospective abnormal pattern to be detected and the position at the length of distance corresponding to the maximum size of the prospective abnormal pattern to be detected, a plurality of the mean values being obtained for each of said radial direction lines by successively setting said end point at the picture elements, (6) calculating the maximum value of said mean values of said index values cos θil, which mean values have been obtained for each of said radial direction lines by successively setting said end point at the picture elements, (7) calculating a total sum of the maximum values, which have been obtained for all of the plurality of said radial direction lines, a value of the degree of centralization of the gradient vector group with respect to said picture element of interest being thereby calculated, (8) comparing the value of said degree of centralization of the gradient vector group, which value has been calculated by the operation of step (7) defined above, and a predetermined threshold value with each other, (9) judging that said picture element of interest is located within the region of the prospective abnormal pattern in cases where the value of said degree of centralization of the gradient vector group is not smaller than the predetermined threshold value, and judging that said picture element of interest is not located within the region of the prospective abnormal pattern in cases where the value of said degree of centralization of the gradient vector group is less than the predetermined threshold value,

(10) successively setting the picture element of interest at all of the picture elements in the radiation image, repeating the operations of steps (3) to (9) defined above, and making judgments as to whether the respective picture elements are or are not located within the region of the prospective abnormal pattern,

(11) calculating the center of gravity on a region constituted of the picture elements, which have been judged as being located within the region of the prospective abnormal pattern,

(12) taking a picture element corresponding to the position, at which the center of gravity is located, as the picture element of interest, and thereby specifying a picture element corresponding to the end point that is associated with the mean value of the index values cos θil having been calculated for each of said radial direction lines, which mean value takes the maximum value in the operation of step (6) defined above,

(13) setting said specified picture element, which corresponds to said end point on each of said radial direction lines, as a marginal point of the region of the prospective abnormal pattern in the direction along which said each radial direction line extends, a plurality of the marginal points being thereby set on the plurality of said radial direction lines, and

(14) connecting the adjacent marginal points, which have been set on the plurality of said radial direction lines, by predetermined lines, the region surrounded by the connecting lines being extracted as the prospective abnormal pattern.

3. A method as defined in claim 1 wherein the detection of the prospective abnormal pattern is carried out with a process comprising the steps of:

(1) for each picture element among all of the picture elements in the one radiation image of the mamma, which is represented by the one image signal, calculating a gradient vector of the image signal, (2) setting an arbitrary picture element, which is among all of the picture elements in the radiation image, as a picture element of interest, (3) setting a plurality of radial direction lines on the radiation image, said radial direction lines extending radially from said picture element of interest and being adjacent to one another at predetermined angle intervals, (4) calculating an index value cos θil for each picture element among the picture elements, which are located along each of said radial direction lines and fall within the range from a picture element that is located at a length of distance corresponding to the minimum size of the prospective abnormal pattern to be detected, the length of distance being taken from said picture element of interest, to a picture element that is located at a length of distance corresponding to the maximum size of the prospective abnormal pattern to be detected, the length of distance being taken from said picture element of interest, said index value cos θil being calculated from an angle θil that is made between said gradient vector, which has been calculated for said each picture element, and the direction along which said each radial direction line extends, (5) calculating a mean value of the index values cos θil having been calculated for the picture elements, which are located along each of said radial direction lines and fall within the range from a starting point to an end point, said starting point being set at the picture element that is located at the length of distance corresponding to the minimum size of the prospective abnormal pattern to be detected, said end point being set at one of the picture elements that are located between the position at the length of distance corresponding to the minimum size of the prospective abnormal pattern to be detected and the position at the length of distance corresponding to the maximum size of the prospective abnormal pattern to be detected, a plurality of the mean values being obtained for each of said radial direction lines by successively setting said end point at the picture elements, (6) calculating the maximum value of said mean values of said index values cos θil, which mean values have been obtained for each of said radial direction lines by successively setting said end point at the picture elements, (7) calculating a total sum of the maximum values, which have been obtained for all of the plurality of said radial direction lines, a value of the degree of centralization of the gradient vector group with respect to said picture element of interest being thereby calculated, (8) comparing the value of said degree of centralization of the gradient vector group, which value has been calculated by the operation of step (7) defined above, and a predetermined threshold value with each other, (9) judging that said picture element of interest is located within the region of the prospective abnormal pattern in cases where the value of said degree of centralization of the gradient vector group is not smaller than the predetermined threshold value, and judging that said picture element of interest is not located within the region of the prospective abnormal pattern in cases where the value of said degree of centralization of the gradient vector group is less than the predetermined threshold value,

(10) successively setting the picture element of interest at all of the picture elements in the radiation image, repeating the operations of steps (3) to (9) defined above, and making judgments as to whether the respective picture elements are or are not located within the region of the prospective abnormal pattern,

(11) calculating the center of gravity on a region constituted of the picture elements, which have been judged as being located within the region of the prospective abnormal pattern,

(12) taking a picture element corresponding to the position, at which the center of gravity is located, as the picture element of interest, and thereby specifying a picture element corresponding to the end point that is associated with the mean value of the index values cos θil having been calculated for each of said radial direction lines, which mean value takes the maximum value in the operation of step (6) defined above,

(13) setting said specified picture element, which corresponds to said end point on each of said radial direction lines, as a marginal point of the region of the prospective abnormal pattern in the direction along which said each radial direction line extends, a plurality of the marginal points being thereby set on the plurality of said radial direction lines, and

(14) connecting the adjacent marginal points, which have been set on the plurality of said radial direction lines, by predetermined lines, the region surrounded by the connecting lines being extracted as the prospective abnormal pattern.

4. A method of detecting a definite prospective abnormal pattern, in which an image signal representing a radiation image of a right mamma of an object and an image signal representing a radiation image of a left mamma of the object are obtained, each of the image signals being made up of a series of image signal components representing picture elements in the radiation image, and wherein a prospective abnormal pattern is detected from one of the radiation images of either one of the right and left mammae by utilizing the respective image signals, the method comprising the steps of:

(a) detecting the prospective abnormal pattern of one of the image signals representing the radiation images of the right and left mammae, (b) setting a region of the detected prospective abnormal pattern in one radiation image, which is represented by the one image signal, and setting a region in the radiation image of the opposite mamma, which region corresponds to the position of said region of the detected prospective abnormal pattern in the one radiation image, (c) carrying out iris filter processing on image signal components, which represent picture elements located in both regions set in step (b), respective iris filter output signals being thereby obtained, (d) calculating a difference value between said respective iris filter output signals, which have been obtained with respect to corresponding picture elements in said both regions, (e) calculating a rating function value, which represents a degree of malignancy of the detected prospective abnormal pattern, in accordance with the image signal components, which represent the picture elements located in said region of the detected prospective abnormal pattern in the one radiation image, and (f) determining the definite prospective abnormal pattern in accordance with said rating function value and said difference value.

5. A method as defined in claim 4 wherein the detection of the prospective abnormal pattern is carried out with a process comprising the steps of:

(1) for each picture element among all of the picture elements in the one radiation image of the mamma, which is represented by the one image signal, calculating a gradient vector of the image signal, (2) setting an arbitrary picture element, which is among all of the picture elements in the radiation image, as a picture element of interest, (3) setting a plurality of radial direction lines on the radiation image, said radial direction lines extending radially from said picture element of interest and being adjacent to one another at predetermined angle intervals, (4) calculating an index value cos θil for each picture element among the picture elements, which are located along each of said radial direction lines and fall within the range from said picture element of interest to a picture element that is located at a length of distance corresponding to the maximum size of the prospective abnormal pattern to be detected, said index value cos θil being calculated from an angle θil that is made between said gradient vector, which has been calculated for said each picture element, and the direction along which said each radial direction line extends, (5) calculating a mean value of the index values cos θil having been calculated for the picture elements, which are located along each of said radial direction lines and fall within the range from a starting point to an end point, said starting point being set at said picture element of interest, said end point being set at one of the picture elements that are located between a position at a length of distance corresponding to the minimum size of the prospective abnormal pattern to be detected and the position at the length of distance corresponding to the maximum size of the prospective abnormal pattern to be detected, a plurality of the mean values being obtained for each of said radial direction lines by successively setting said end point at the picture elements, (6) calculating the maximum value of said mean values of said index values cos θil, which mean values have been obtained for each of said radial direction lines by successively setting said end point at the picture elements, (7) calculating a total sum of the maximum values, which have been obtained for all of the plurality of said radial direction lines, a value of the degree of centralization of the gradient vector group with respect to said picture element of interest being thereby calculated, (8) comparing the value of said degree of centralization of the gradient vector group, which value has been calculated by the operation of step (7) defined above, and a predetermined threshold value with each other, (9) judging that said picture element of interest is located within the region of the prospective abnormal pattern in cases where the value of said degree of centralization of the gradient vector group is not smaller than the predetermined threshold value, and judging that said picture element of interest is not located within the region of the prospective abnormal pattern in cases where the value of said degree of centralization of the gradient vector group is less than the predetermined threshold value,

(10) successively setting the picture element of interest at all of the picture elements in the radiation image, repeating the operations of steps (3) to (9) defined above, and making judgments as to whether the respective picture elements are or are not located within the region of the prospective abnormal pattern,

(11) calculating the center of gravity on a region constituted of the picture elements, which have been judged as being located within the region of the prospective abnormal pattern,

(12) taking a picture element corresponding to the position, at which the center of gravity is located, as the picture element of interest, and thereby specifying a picture element corresponding to the end point that is associated with the mean value of the index values cos θil having been calculated for each of said radial direction lines, which mean value takes the maximum value in the operation of step (6) defined above,

(13) setting said specified picture element, which corresponds to said end point on each of said radial direction lines, as a marginal point of the region of the prospective abnormal pattern in the direction along which said each radial direction line extends, a plurality of the marginal points being thereby set on the plurality of said radial direction lines, and

(14) connecting the adjacent marginal points, which have been set on the plurality of said radial direction lines, by predetermined lines, the region surrounded by the connecting lines being extracted as the prospective abnormal pattern.

6. A method as defined in claim 4 wherein the detection of the prospective abnormal pattern is carried out with a process comprising the steps of:

(1) for each picture element among all of the picture elements in the one radiation image of the mamma, which is represented by the one image signal, calculating a gradient vector of the image signal, (2) setting an arbitrary picture element, which is among all of the picture elements in the radiation image, as a picture element of interest, (3) setting a plurality of radial direction lines on the radiation image, said radial direction lines extending radially from said picture element of interest and being adjacent to one another at predetermined angle intervals, (4) calculating an index value cos θil for each picture element among the picture elements, which are located along each of said radial direction lines and fall within the range from a picture element that is located at a length of distance corresponding to the minimum size of the prospective abnormal pattern to be detected, the length of distance being taken from said picture element of interest, to a picture element that is located at a length of distance corresponding to the maximum size of the prospective abnormal pattern to be detected, the length of distance being taken from said picture element of interest, said index value cos θil being calculated from an angle θil that is made between said gradient vector, which has been calculated for said each picture element, and the direction along which said each radial direction line extends, (5) calculating a mean value of the index values cos θil having been calculated for the picture elements, which are located along each of said radial direction lines and fall within the range from a starting point to an end point, said starting point being set at the picture element that is located at the length of distance corresponding to the minimum size of the prospective abnormal pattern to be detected, said end point being set at one of the picture elements that are located between the position at the length of distance corresponding to the minimum size of the prospective abnormal pattern to be detected and the position at the length of distance corresponding to the maximum size of the prospective abnormal pattern to be detected, a plurality of the mean values being obtained for each of said radial direction lines by successively setting said end point at the picture elements, (6) calculating the maximum value of said mean values of said index values cos θil, which mean values have been obtained for each of said radial direction lines by successively setting said end point at the picture elements, (7) calculating a total sum of the maximum values, which have been obtained for all of the plurality of said radial direction lines, a value of the degree of centralization of the gradient vector group with respect to said picture element of interest being thereby calculated, (8) comparing the value of said degree of centralization of the gradient vector group, which value has been calculated by the operation of step (7) defined above, and a predetermined threshold value with each other, (9) judging that said picture element of interest is located within the region of the prospective abnormal pattern in cases where the value of said degree of centralization of the gradient vector group is not smaller than the predetermined threshold value, and judging that said picture element of interest is not located within the region of the prospective abnormal pattern in cases where the value of said degree of centralization of the gradient vector group is less than the predetermined threshold value,

(10) successively setting the picture element of interest at all of the picture elements in the radiation image, repeating the operations of steps (3) to (9) defined above, and making judgments as to whether the respective picture elements are or are not located within the region of the prospective abnormal pattern,

(11) calculating the center of gravity on a region constituted of the picture elements, which have been judged as being located within the region of the prospective abnormal pattern,

(12) taking a picture element corresponding to the position, at which the center of gravity is located, as the picture element of interest, and thereby specifying a picture element corresponding to the end point that is associated with the mean value of the index values cos θil having been calculated for each of said radial direction lines, which mean value takes the maximum value in the operation of step (6) defined above,

(13) setting said specified picture element, which corresponds to said end point on each of said radial direction lines, as a marginal point of the region of the prospective abnormal pattern in the direction along which said each radial direction line extends, a plurality of the marginal points being thereby set on the plurality of said radial direction lines, and

(14) connecting the adjacent marginal points, which have been set on the plurality of said radial direction lines, by predetermined lines, the region surrounded by the connecting lines being extracted as the prospective abnormal pattern.

7. An apparatus for detecting a definite prospective abnormal pattern, in which an image signal representing a radiation image of a right mamma of an object and an image signal representing a radiation image of a left mamma of the object are obtained, each of the image signals being made up of a series of image signal components representing picture elements in the radiation image, and wherein a prospective abnormal pattern is detected from one of the radiation images of either one of the right and left mammae using the respective image signals, the apparatus comprising:

(a) detection means for detecting the prospective abnormal pattern of one of the image signals representing the radiation images of the right and left mammae, (b) region setting means for setting a region of the detected prospective abnormal pattern in one radiation image, which is represented by the one image signal, and for setting a region in the radiation image of the opposite mamma, which region corresponds to the position of said region of the detected prospective abnormal pattern in the one radiation image, (c) iris filter processing means for carrying out iris filter processing on image signal components, which represent picture elements located in both regions set by said region setting means, respective iris filter output signals being thereby obtained, (d) difference value calculating means for calculating a difference value between said respective iris filter output signals, which have been obtained with respect to corresponding picture elements in said both regions, and (e) definite prospective abnormal pattern detecting means for detecting the definite prospective abnormal pattern using said difference value calculated by said difference value calculating means.

8. An apparatus as defined in claim 7 wherein said detection means comprises:

(i) a gradient vector calculating means for calculating a gradient vector of the image signal, the calculation being made for each picture element among all of the picture elements in the one radiation image of the mamma, which is represented by the one image signal, (ii) a picture-element-of-interest setting means for setting an arbitrary picture element, which is among all of the picture elements in the radiation image, as a picture element of interest, the picture elements being successively set as said picture element of interest, (iii) a detection size setting means for setting the minimum size and the maximum size of the prospective abnormal pattern to be detected, (iv) a direction line setting means for setting a plurality of radial direction lines on the radiation image, said radial direction lines extending radially from said picture element of interest and being adjacent to one another at predetermined angle intervals, (v) an index value calculating means for calculating an index value cos θil for each picture element among the picture elements, which are located along each of said radial direction lines and fall within the range from said picture element of interest to a picture element that is located at a length of distance corresponding to the maximum size of the prospective abnormal pattern to be detected, said index value cos θil being calculated from an angle θil that is made between said gradient vector, which has been calculated for said each picture element, and the direction along which said each radial direction line extends, (vi) a maximum value calculating means for calculating a mean value of the index values cos θil having been calculated for the picture elements, which are located along each of said radial direction lines and fall within the range from a starting point to an end point, said starting point being set at said picture element of interest, said end point being set at one of the picture elements that are located between a position at a length of distance corresponding to the minimum size of the prospective abnormal pattern to be detected and the position at the length of distance corresponding to the maximum size of the prospective abnormal pattern to be detected, a plurality of the mean values being obtained for each of said radial direction lines by successively setting said end point at the picture elements, said maximum value calculating means extracting the maximum value of said mean values of said index values cos θil, which mean values have been obtained for each of said radial direction lines by successively setting said end point at the picture elements, (vii) a centralization degree calculating means for calculating a total sum of the maximum values, which have been obtained for all of the plurality of said radial direction lines, and thereby calculating a value of the degree of centralization of the gradient vector group with respect to said picture element of interest, (viii) a comparison and judgment means for comparing the value of said degree of centralization of the gradient vector group, which value has been calculated by said centralization degree calculating means, and a predetermined threshold value with each other, said comparison and judgment means judging that said picture element of interest is located within the region of the prospective abnormal pattern in cases where the value of said degree of centralization of the gradient vector group is not smaller than the predetermined threshold value, and judging that said picture element of interest is not located within the region of the prospective abnormal pattern in cases where the value of said degree of centralization of the gradient vector group is less than the predetermined threshold value, (ix) a center-of-gravity calculating means for calculating the center of gravity on a region constituted of the picture elements, which have been judged as being located within the region of the prospective abnormal pattern, (x) a marginal point setting means for taking a picture element corresponding to the position, at which the center of gravity is located, as the picture element of interest, and thereby specifying a picture element corresponding to the end point that is associated with the maximum value having been extracted by said maximum value calculating means, said picture element corresponding to the end point being specified with respect to each of said radial direction lines, said marginal point setting means setting said specified picture element, which corresponds to said end point on each of said radial direction lines, as a marginal point of the region of the prospective abnormal pattern in the direction along which said each radial direction line extends, a plurality of the marginal points being thereby set on the plurality of said radial direction lines, and (xi) a contour extracting means for connecting the adjacent marginal points, which have been set on the plurality of said radial direction lines, by predetermined lines, and extracting the region, which is surrounded by the connecting lines, as the prospective abnormal pattern.

9. An apparatus as defined in claim 7 wherein said detection means comprises:

(i) a gradient vector calculating means for calculating a gradient vector of the image signal, the calculation being made for each picture element among all of the picture elements in the one radiation image of the mamma, which is represented by the one image signal, (ii) a picture-element-of-interest setting means for setting an arbitrary picture element, which is among all of the picture elements in the radiation image, as a picture element of interest, the picture elements being successively set as said picture element of interest, (iii) a detection size setting means for setting the minimum size and the maximum size of the prospective abnormal pattern to be detected, (iv) a direction line setting means for setting a plurality of radial direction lines on the radiation image, said radial direction lines extending radially from said picture element of interest and being adjacent to one another at predetermined angle intervals, (v) an index value calculating means for calculating an index value cos θil for each picture element among the picture elements, which are located along each of said radial direction lines and fall within the range from a picture element that is located at a length of distance corresponding to the minimum size of the prospective abnormal pattern to be detected, the length of distance being taken from said picture element of interest, to a picture element that is located at a length of distance corresponding to the maximum size of the prospective abnormal pattern to be detected, the length of distance being taken from said picture element of interest, said index value cos θil being calculated from an angle θil that is made between said gradient vector, which has been calculated for said each picture element, and the direction along which said each radial direction line extends, (vi) a maximum value calculating means for calculating a mean value of the index values cos θil having been calculated for the picture elements, which are located along each of said radial direction lines and fall within the range from a starting point to an end point, said starting point being set at the picture element that is located at the length of distance corresponding to the minimum size of the prospective abnormal pattern to be detected, said end point being set at one of the picture elements that are located between the position at the length of distance corresponding to the minimum size of the prospective abnormal pattern to be detected and the position at the length of distance corresponding to the maximum size of the prospective abnormal pattern to be detected, a plurality of the mean values being obtained for each of said radial direction lines by successively setting said end point at the picture elements, said maximum value calculating means extracting the maximum value of said mean values of said index values cos θil, which mean values have been obtained for each of said radial direction lines by successively setting said end point at the picture elements, (vii) a centralization degree calculating means for calculating a total sum of the maximum values, which have been obtained for all of the plurality of said radial direction lines, and thereby calculating a value of the degree of centralization of the gradient vector group with respect to said picture element of interest, (viii) a comparison and judgment means for comparing the value of said degree of centralization of the gradient vector group, which value has been calculated by said centralization degree calculating means, and a predetermined threshold value with each other, said comparison and judgment means judging that said picture element of interest is located within the region of the prospective abnormal pattern in cases where the value of said degree of centralization of the gradient vector group is not smaller than the predetermined threshold value, and judging that said picture element of interest is not located within the region of the prospective abnormal pattern in cases where the value of said degree of centralization of the gradient vector group is less than the predetermined threshold value, (ix) a center-of-gravity calculating means for calculating the center of gravity on a region constituted of the picture elements, which have been judged as being located within the region of the prospective abnormal pattern, (x) a marginal point setting means for taking a picture element corresponding to the position, at which the center of gravity is located, as the picture element of interest, and thereby specifying a picture element corresponding to the end point that is associated with the maximum value having been extracted by said maximum value calculating means, said picture element corresponding to the end point being specified with respect to each of said radial direction lines, said marginal point setting means setting said specified picture element, which corresponds to said end point on each of said radial direction lines, as a marginal point of the region of the prospective abnormal pattern in the direction along which said each radial direction line extends, a plurality of the marginal points being thereby set on the plurality of said radial direction lines, and (xi) a contour extracting means for connecting the adjacent marginal points, which have been set on the plurality of said radial direction lines, by predetermined lines, and extracting the region, which is surrounded by the connecting lines, as the prospective abnormal pattern.

10. An apparatus for detecting a definite prospective abnormal pattern, in which an image signal representing a radiation image of a right mamma of an object and an image signal representing a radiation image of a left mamma of the object are obtained, each of the image signals being made up of a series of image signal components representing picture elements in the radiation image, and wherein a prospective abnormal pattern is detected from one of the radiation images of either one of the right and left mammae using the respective image signals, the apparatus comprising:

(a) detection means for detecting the prospective abnormal pattern of one of the image signals representing the radiation images of the right and left mammae, (b) region setting means for setting a region of the detected prospective abnormal pattern in one radiation image, which is represented by the one image signal, and for setting a region in the radiation image of the opposite mamma, which region corresponds to the position of said region of the detected prospective abnormal pattern in the one radiation image, (c) iris filter processing means for carrying out iris filter processing on image signal components, which represent picture elements located in both regions set by said region setting means, respective iris filter output signals being thereby obtained, (d) difference value calculating means for calculating a difference value between said respective iris filter output signals, which have been obtained with respect to corresponding picture elements in said both regions, (e) rating function value calculating means for calculating a rating function value, which represents a degree of malignancy of the detected prospective abnormal pattern, in accordance with the image signal components, which represent the picture elements located in said region of the detected prospective abnormal pattern in the one radiation image, and (f) definite prospective abnormal pattern detecting means for detecting the definite prospective abnormal pattern using said rating function value, which has been calculated by said rating function value calculating means, and said difference value, which has been calculated by said difference value calculating means.

11. An apparatus as defined in claim 10 wherein said detection means comprises:

(i) a gradient vector calculating means for calculating a gradient vector of the image signal, the calculation being made for each picture element among all of the picture elements in the one radiation image of the mamma, which is represented by the one image signal, (ii) a picture-element-of-interest setting means for setting an arbitrary picture element, which is among all of the picture elements in the radiation image, as a picture element of interest, the picture elements being successively set as said picture element of interest, (iii) a detection size setting means for setting the minimum size and the maximum size of the prospective abnormal pattern to be detected, (iv) a direction line setting means for setting a plurality of radial direction lines on the radiation image, said radial direction lines extending radially from said picture element of interest and being adjacent to one another at predetermined angle intervals, (v) an index value calculating means for calculating an index value $\cos \theta il$ for each picture element among the picture elements, which are located along each of said radial direction lines and fall within the range from said picture element of interest to a picture element that is located at a length of distance corresponding to the maximum size of the prospective abnormal pattern to be detected, said index value $\cos \theta il$ being calculated from an angle $\theta il$ that is made between said gradient vector, which has been calculated for said each picture element, and the direction along which said each radial direction line extends, (vi) a maximum value calculating means for calculating a mean value of the index values $\cos \theta il$ having been calculated for the picture elements, which are located along each of said radial direction lines and fall within the range from a starting point to an end point, said starting point being set at said picture element of interest, said end point being set at one of the picture elements that are located between a position at a length of distance corresponding to the minimum size of the prospective abnormal pattern to be detected and the position at the length of distance corresponding to the maximum size of the prospective abnormal pattern to be detected, a plurality of the mean values being obtained for each of said radial direction lines by successively setting said end point at the picture elements, said maximum value calculating means extracting the maximum value of said mean values of said index values $\cos \theta il$, which mean values have been obtained for each of said radial direction lines by successively setting said end point at the picture elements, (vii) a centralization degree calculating means for calculating a total sum of the maximum values, which have been obtained for all of the plurality of said radial direction lines, and thereby calculating a value of the degree of centralization of the gradient vector group with respect to said picture element of interest, (viii) a comparison and judgment means for comparing the value of said degree of centralization of the gradient vector group, which value has been calculated by said centralization degree calculating means, and a predetermined threshold value with each other, said comparison and judgment means judging that said picture element of interest is located within the region of the prospective abnormal pattern in cases where the value of said degree of centralization of the gradient vector group is not smaller than the predetermined threshold value, and judging that said picture element of interest is not located within the region of the prospective abnormal pattern in cases where the value of said degree of centralization of the gradient vector group is less than the predetermined threshold value, (ix) a center-of-gravity calculating means for calculating the center of gravity on a region constituted of the picture elements, which have been judged as being located within the region of the prospective abnormal pattern, (x) a marginal point setting means for taking a picture element corresponding to the position, at which the center of gravity is located, as the picture element of interest, and thereby specifying a picture element corresponding to the end point that is associated with the maximum value having been extracted by said maximum value calculating means, said picture element corresponding to the end point being specified with respect to each of said radial direction lines, said marginal point setting means setting said specified picture element, which corresponds to said end point on each of said radial direction lines, as a marginal point of the region of the prospective abnormal pattern in the direction along which said each radial direction line extends, a plurality of the marginal points being thereby set on the plurality of said radial direction lines, and (xi) a contour extracting means for connecting the adjacent marginal points, which have been set on the plurality of said radial direction lines, by predetermined lines, and extracting the region, which is surrounded by the connecting lines, as the prospective abnormal pattern.

12. An apparatus as defined in claim 10 wherein said detection means comprises:

(i) a gradient vector calculating means for calculating a gradient vector of the image signal, the calculation being made for each picture element among all of the picture elements in the one radiation image of the mamma, which is represented by the one image signal, (ii) a picture-element-of-interest setting means for setting an arbitrary picture element, which is among all of the picture elements in the radiation image, as a picture element of interest, the picture elements being successively set as said picture element of interest, (iii) a detection size setting means for setting the minimum size and the maximum size of the prospective abnormal pattern to be detected, (iv) a direction line setting means for setting a plurality of radial direction lines on the radiation image, said radial direction lines extending radially from said picture element of interest and being adjacent to one another at predetermined angle intervals, (v) an index value calculating means for calculating an index value cos θil for each picture element among the picture elements, which are located along each of said radial direction lines and fall within the range from a picture element that is located at a length of distance corresponding to the minimum size of the prospective abnormal pattern to be detected, the length of distance being taken from said picture element of interest, to a picture element that is located at a length of distance corresponding to the maximum size of the prospective abnormal pattern to be detected, the length of distance being taken from said picture element of interest, said index value cos θil being calculated from an angle θil that is made between said gradient vector, which has been calculated for said each picture element, and the direction along which said each radial direction line extends, (vi) a maximum value calculating means for calculating a mean value of the index values cos θil having been calculated for the picture elements, which are located along each of said radial direction lines and fall within the range from a starting point to an end point, said starting point being set at the picture element that is located at the length of distance corresponding to the minimum size of the prospective abnormal pattern to be detected, said end point being set at one of the picture elements that are located between the position at the length of distance corresponding to the minimum size of the prospective abnormal pattern to be detected and the position at the length of distance corresponding to the maximum size of the prospective abnormal pattern to be detected, a plurality of the mean values being obtained for each of said radial direction lines by successively setting said end point at the picture elements, said maximum value calculating means extracting the maximum value of said mean values of said index values cos θil, which mean values have been obtained for each of said radial direction lines by successively setting said end point at the picture elements, (vii) a centralization degree calculating means for calculating a total sum of the maximum values, which have been obtained for all of the plurality of said radial direction lines, and thereby calculating a value of the degree of centralization of the gradient vector group with respect to said picture element of interest, (viii) a comparison and judgment means for comparing the value of said degree of centralization of the gradient vector group, which value has been calculated by said centralization degree calculating means, and a predetermined threshold value with each other, said comparison and judgment means judging that said picture element of interest is located within the region of the prospective abnormal pattern in cases where the value of said degree of centralization of the gradient vector group is not smaller than the predetermined threshold value, and judging that said picture element of interest is not located within the region of the prospective abnormal pattern in cases where the value of said degree of centralization of the gradient vector group is less than the predetermined threshold value, (ix) a center-of-gravity calculating means for calculating the center of gravity on a region constituted of the picture elements, which have been judged as being located within the region of the prospective abnormal pattern, (x) a marginal point setting means for taking a picture element corresponding to the position, at which the center of gravity is located, as the picture element of interest, and thereby specifying a picture element corresponding to the end point that is associated with the maximum value having been extracted by said maximum value calculating means, said picture element corresponding to the end point being specified with respect to each of said radial direction lines, said marginal point setting means setting said specified picture element, which corresponds to said end point on each of said radial direction lines, as a marginal point of the region of the prospective abnormal pattern in the direction along which said each radial direction line extends, a plurality of the marginal points being thereby set on the plurality of said radial direction lines, and (xi) a contour extracting means for connecting the adjacent marginal points, which have been set on the plurality of said radial direction lines, by predetermined lines, and extracting the region, which is surrounded by the connecting lines, as the prospective abnormal pattern.

13. A method for detecting a definite prospective abnormal pattern in mammae, said method comprising:

(a) obtaining a first radiation image of a first mamma and a second radiation image of a second mamma;

(b) detecting a prospective abnormal pattern in one of the first and second radiation images;

(c) disposing said first and second radiation images to be symmetrical about an axis of symmetry;

(d) carrying out iris filter processing on image signal components of a region at which the prospective abnormal pattern was detected in one of the first and second radiation images at step (b), and on image signal components in a corresponding region opposite said axis of symmetry in the other one of said first and second radiation images, whereby respective iris filter output signals are obtained for each of said regions, and (e) determining a definite prospective abnormal pattern based upon the respective iris filter output signals.

14. The method of determining a definite prospective abnormal pattern as claimed in claim 13, wherein determining the definite prospective abnormal pattern based on said respective iris filter output signals comprises, calculating a difference value between the respective iris filter output signals, and comparing the difference value to a predetermined value.

15. The method of determining a definite prospective abnormal pattern as claimed in claim 13, wherein determining the definite prospective abnormal pattern further comprises calculating a rating function value, which represents a degree of malignancy of the detected prospective abnormal pattern.

16. The method of determining a definite prospective abnormal pattern according to claim 15, wherein calculating a rating function value comprises determining a Mahalanobis distance of said prospective abnormal pattern and, comparing the Mahalanobis distance to a predetermined nominal value.

* * * * *